(12) United States Patent
Tamura et al.

(10) Patent No.: US 8,224,101 B2
(45) Date of Patent: Jul. 17, 2012

(54) IMAGE PROCESSING APPARATUS AND CONTROL METHOD THEREOF WITH COLOR DATA AND MONOCHROME DATA SELECTION

(75) Inventors: Hirokazu Tamura, Chofu (JP); Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1159 days.

(21) Appl. No.: 11/834,890

(22) Filed: Aug. 7, 2007

(65) Prior Publication Data

US 2008/0037882 A1  Feb. 14, 2008

(30) Foreign Application Priority Data

Aug. 8, 2006  (JP) .................................. 2006-216259

(51) Int. Cl.
*G06K 9/36* (2006.01)
(52) U.S. Cl. .......................... 382/232; 382/170; 382/266
(58) Field of Classification Search .................. 382/170, 382/232, 266
See application file for complete search history.

(56) References Cited

U.S. PATENT DOCUMENTS

| | | | |
|---|---|---|---|
| 6,108,017 A | 8/2000 | Katakura et al. .............. 347/115 |
| 6,370,278 B1 * | 4/2002 | Waguri ......................... 382/266 |
| 7,106,911 B2 | 9/2006 | Ohta et al. .................... 382/251 |
| 7,194,140 B2 | 3/2007 | Ito et al. |
| 7,227,998 B2 | 6/2007 | Nakayama et al. ........... 382/232 |
| 7,257,264 B2 | 8/2007 | Nakayama et al. |
| 7,343,291 B2 | 3/2008 | Thumpudi et al. ............ 704/500 |
| 7,424,162 B2 | 9/2008 | Kitamura ...................... 382/239 |
| 7,680,345 B2 | 3/2010 | Ito et al. ........................ 382/232 |
| 2001/0024518 A1 * | 9/2001 | Yaguchi ........................ 382/170 |
| 2003/0228063 A1 | 12/2003 | Nakayama et al. ........... 382/251 |
| 2006/0023957 A1 | 2/2006 | Ito |
| 2006/0045362 A1 | 3/2006 | Ito et al. ........................ 382/232 |
| 2006/0050974 A1 | 3/2006 | Tamura et al. ................ 382/232 |
| 2006/0050975 A1 | 3/2006 | Ito et al. |
| 2006/0056713 A1 | 3/2006 | Ito et al. |
| 2006/0104528 A1 | 5/2006 | Tamura et al. |
| 2006/0206867 A1 | 9/2006 | Parsons et al. |
| 2007/0206867 A1 | 9/2007 | Tamura et al. ................ 382/232 |
| 2009/0046777 A1 | 2/2009 | Kitamura ................. 375/240.02 |

FOREIGN PATENT DOCUMENTS

| | | |
|---|---|---|
| JP | 07-147638 A | 6/1995 |
| JP | 08328528 | * 12/1996 |
| JP | 11-164153 | 6/1999 |
| JP | 2001-45301 | 2/2001 |
| JP | 2002-369198 A | 12/2002 |
| JP | 2003-125206 | 4/2003 |

(Continued)

*Primary Examiner* — Chan S Park
*Assistant Examiner* — Eueng-Nan Yeh
(74) *Attorney, Agent, or Firm* — Fitzpatrick, Cella, Harper & Scinto

(57) ABSTRACT

In this invention, image data expressed by one component is encoded at a high speed by using a color image lossless encoder. To do this, a color conversion unit converts color image data read by a document reading unit into C, M, Y, and K data. In a color reading mode, a switching unit directly outputs the C, M, Y, and K data to an encoding unit. If the reading mode is a monochrome reading mode, the switching unit neglects the C, M, and Y components of the C, M, Y, and K data. Every time four K components are input, the switching unit supplies the four K components to the encoding unit as pseudo data of C, M, Y, and K color components. The encoding unit lossless-encodes the received C, M, Y, and K component data.

25 Claims, 20 Drawing Sheets

FOREIGN PATENT DOCUMENTS

| | | | |
|---|---|---|---|
| JP | 2003101798 | * | 4/2003 |
| JP | 2004-215093 | | 7/2004 |
| JP | 2004-228952 | | 8/2004 |
| JP | 2005-278205 A | | 10/2005 |
| WO | WO 03/084243 A1 | | 10/2003 |

* cited by examiner

IMAGE PROCESSING APPARATUS AND CONTROL METHOD THEREOF WITH COLOR DATA AND MONOCHROME DATA SELECTION

BACKGROUND OF THE INVENTION

1. Field of the Invention

The present invention relates to an image data compression coding technique.

2. Description of the Related Art

Conventionally, a JPEG method using discrete cosine transformation or a method using Wavelet transformation is often used as a still image compression method. These encoding methods segment an image into specific encoding blocks and execute discrete cosine transformation or Wavelet transformation for each block. Hence, a parallel process in an image is relatively easy. In this case, for example, the process speed can be improved by increasing the degree of parallelism in hardware implementation.

A monochrome grayscale image contains only one component and has a small amount of information as compared to a color image expressed by a plurality of components. If such a grayscale image is encoded by a color image encoder, encoding is done assuming that the nonexistent components exist, resulting in perceptible redundancy. Since the time required to encode a monochrome grayscale image almost equals that required to encode a color image, the process efficiency is susceptible to improvement. This also applies to software implementation.

The following example is known as an arrangement for speeding up grayscale image processing by using an RGB encoder.

First, RGB→YCbCr color space conversion is executed for a grayscale image which has no color difference components. Color space conversion of a gray image area is done by setting the code amounts of color difference components to 0 and validating only the luminance component. After that, all processes after color space conversion are executed. This improves the process speed and encoding efficiency while avoiding waste in the process (e.g., Japanese Patent Laid-Open No. 2004-228952).

However, some image encoding methods and, more particularly, many lossless image encoding methods process not each block but each pixel sequentially. In, e.g., a JPEG-LS method, codes are determined by changing the mode depending on the states of neighboring pixels around a pixel of interest. If the degree of parallelism is to be increased in this method, a block process is necessary as in the above-described JPEG method. In addition, it is difficult to use a color encoder.

An encoding method for each pixel, represented by JPEG-LS, increases the compression efficiency by reducing the redundancy on the basis of correlation to neighboring pixels. Hence, an excessive block process for improving the speed leads to deterioration of the compression efficiency.

In a color image expressed by R, G, and B data, one pixel holds three R, G, and B components. The mode change timing and pattern dictionary updating for each pixel are done for a set of R, G, and B components. As far as a color image encoder is used, the encoding process cannot speed up in either a grayscale image containing one component or an image containing three components if the number of pixels remains unchanged.

SUMMARY OF THE INVENTION

The present invention has been made in consideration of the above problems, and has as its object to provide a technique of enabling high-speed encoding of image data containing one component using a color image lossless encoder.

In order to achieve the above-described object, for example, an image processing apparatus of the present invention has the following arrangement. That is, there is provided an image processing apparatus for encoding image data, comprising:

an encoding unit adapted to encode color image data expressed by N (N≧2) components;

a determination unit adapted to determine whether encoding target image data is monochrome image data containing one component or color image data containing data of the N components;

a supply unit adapted to supply the color image data to the encoding unit when the determination unit determines that the encoding target image data is the color image data, and supply M data in the monochrome image data to the encoding unit as pseudo data of the N components of the color image when the determination unit determines that the encoding target image data is the monochrome image data; and an output unit adapted to output lossless-encoded data generated by the encoding unit from the data supplied by the supply unit.

According to the present invention, it is possible to encode image data expressed by one component at a high speed using a color image encoder.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The embodiments of the present invention will be described below with reference to the accompanying drawings. In the embodiments, a color copying machine will be exemplified as an image processing apparatus. The embodiments are also applicable to a circuit for compression-coding image data or software for compressing image data. Hence, the present invention is not limited to a copying machine.

<Explanation of Outline of Apparatus>

Figure 1:
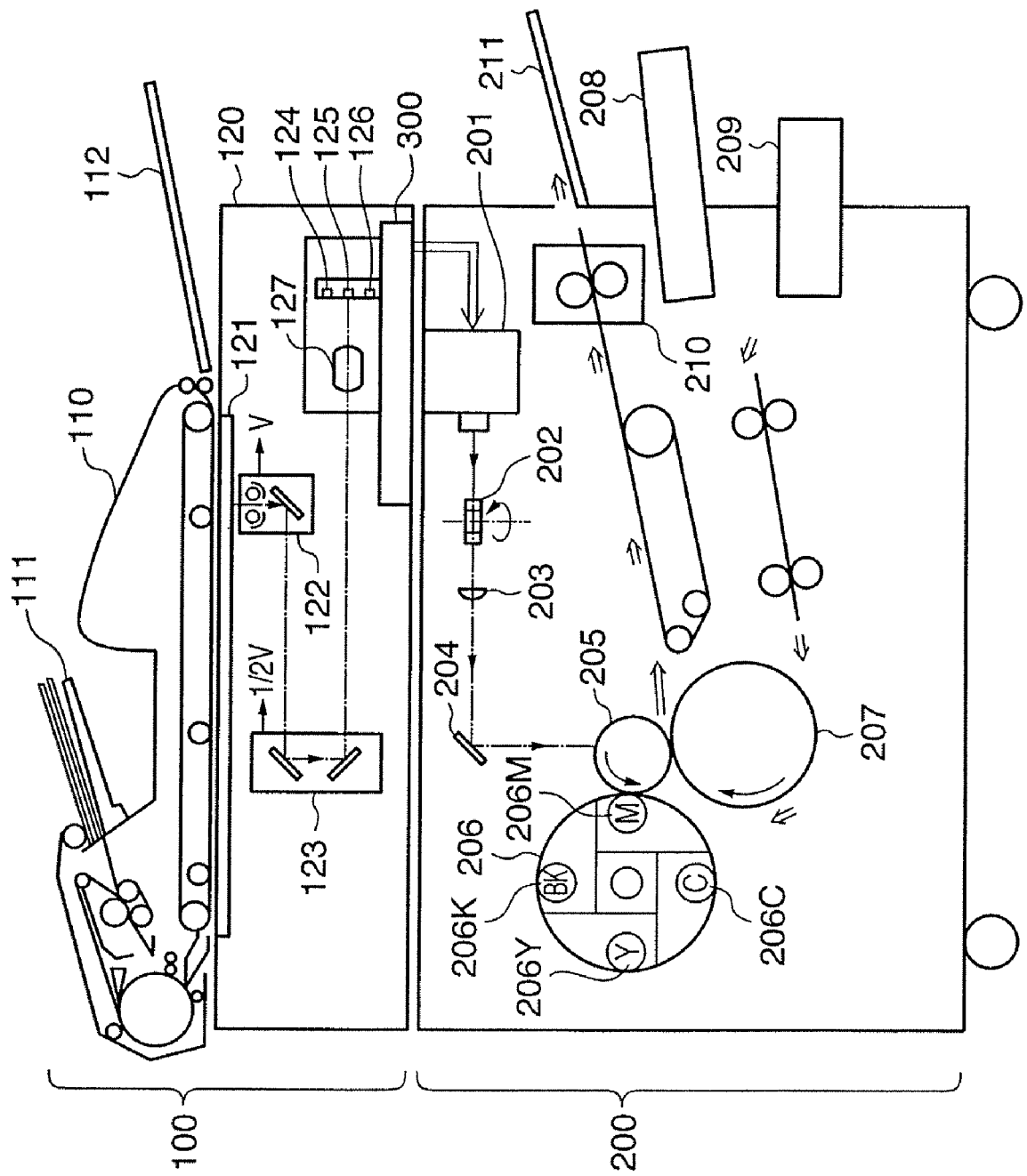
FIG. 1 is a sectional view showing the structure of a copying machine according to an embodiment.

FIG. 1 is a sectional view showing the structure of a copying machine according to an embodiment. This apparatus mainly includes a document reading unit 100 and a printer engine unit 200.

The document reading unit 100 has an ADF (Auto Document Feeder) unit 110 and a scanner unit 120. The document reading unit 100 also has an operation panel 400 (FIG. 2) including a liquid crystal display device and various switches and buttons (not shown).

The ADF unit 110 has a tray 111 on which documents are placed. In a copy mode, document sheets are conveyed onto a document table glass 121 of the scanner unit 120 one by one, read, and discharged to a discharge tray 112.

The scanner unit 120 has the document table glass (platen glass) 121, and an exposure unit 122 incorporating a fluorescent lamp which illuminates a document reading surface from the lower side. The scanner unit 120 also has a mirror unit 123, condenser lens 127, and linear CCD image sensors 124, 125, and 126 for color components. The linear CCD image sensors 124, 125, and 126 separate light from a document into color components of red (R), green (G), and blue (B) and read them. The read color component data (each having 8 bits) are supplied to an image processing unit 300.

The exposure unit 122 moves at a velocity v, and the mirror unit 123 moves at a velocity v/2 in the direction (direction perpendicular to the pixel array of the linear CCD image sensors) of arrows in FIG. 1, thereby maintaining a predetermined distance between the exposure unit 122 and the linear CCD image sensors 124 to 126.

The image processing unit 300 will be described later in detail. The image processing unit 300 stores the read document images and converts the stored image data into print color components of yellow (Y), magenta (M), cyan (C), and black (K) and stores them. The image processing unit 300 plane-sequentially outputs the Y, M, C, and K image data to the printer engine unit 200.

The printer engine unit 200 includes a laser driver 201, polygon mirror 202, f-θ lens 203, mirror 204, photosensitive drum 205, developer 206, transfer drum 207, feed cassettes 208 and 209, fixing unit 210, and discharge tray 211.

A printing paper sheet is conveyed from the feed cassette 208 or 209 via a conveyor belt, and the transfer drum 207 winds the paper sheet around itself by the action of static electricity.

The laser driver 201 drives a laser element corresponding to one of Y, M, C, and K image data plane-sequentially sent from the image processing unit 300, thereby irradiating the polygon mirror 202 with a laser beam. The polygon mirror 202 rotates about its own axis, as shown in FIG. 1, and reflects the laser beam by its side surface to sweep the laser beam to a one-dimensional axis perpendicular to the drawing surface of FIG. 1. The mirror 204 reflects the laser beam to the photosensitive drum. The laser beam scans and exposes the surface of the photosensitive drum 205 in the direction perpendicular to the drawing surface. Since the photosensitive drum 205 rotates as indicated by an arrow in FIG. 1, a two-dimensional electrostatic latent image is formed on the surface by scan and exposure.

The developer 206 accommodating developing units 206M, 206C, 206Y, and 206K of yellow, magenta, cyan, and black can rotate. The developer 206 makes one of the four developing units abut against the photosensitive drum 205 in correspondence with a color component under scan and exposure. As a result, the color toner of the abutting developing unit attracts to the surface of the photosensitive drum 205 by the action of static electricity. The toner attracting to the photosensitive drum 205 is transferred to the printing paper sheet wound around the transfer drum 207.

The above-described process is executed for the four Y, M, C, and K components to superpose and transfer four color toners onto the printing paper sheet wound around the transfer drum 207. Then, the printing paper sheet is separated from the transfer drum 207 by a separation gripper (not shown) and conveyed to the fixing unit 210. The fixing unit 210 fixes the toners on the printing paper sheet by the action of heat. The printing paper sheet after fixing is discharged to the discharge tray 211.

A color copy process has been described above. In a monochrome copy mode, only a luminance component is extracted from R, G, and B data read from a document. Black density data is generated from the luminance component. Then, the laser driver 201 is driven. At this time, the developer 206 makes the black developing unit 206K abut against the photosensitive drum 205. A monochrome black toner image is transferred to a conveyed printing paper sheet. The printing paper sheet is conveyed to the fixing unit 210 and discharged. That is, the process of forming C, M, and Y images is omitted. Except the printing paper sheet conveyance time in the apparatus, the time required to form an image in the monochrome copy mode is ¼ that in the color copy mode. Hence, high-speed copy is possible.

In this embodiment, a laser beam printer has been exemplified as the printer engine unit 200. However, an inkjet printer is also usable, and any other printing method can be adopted.

Figure 2:
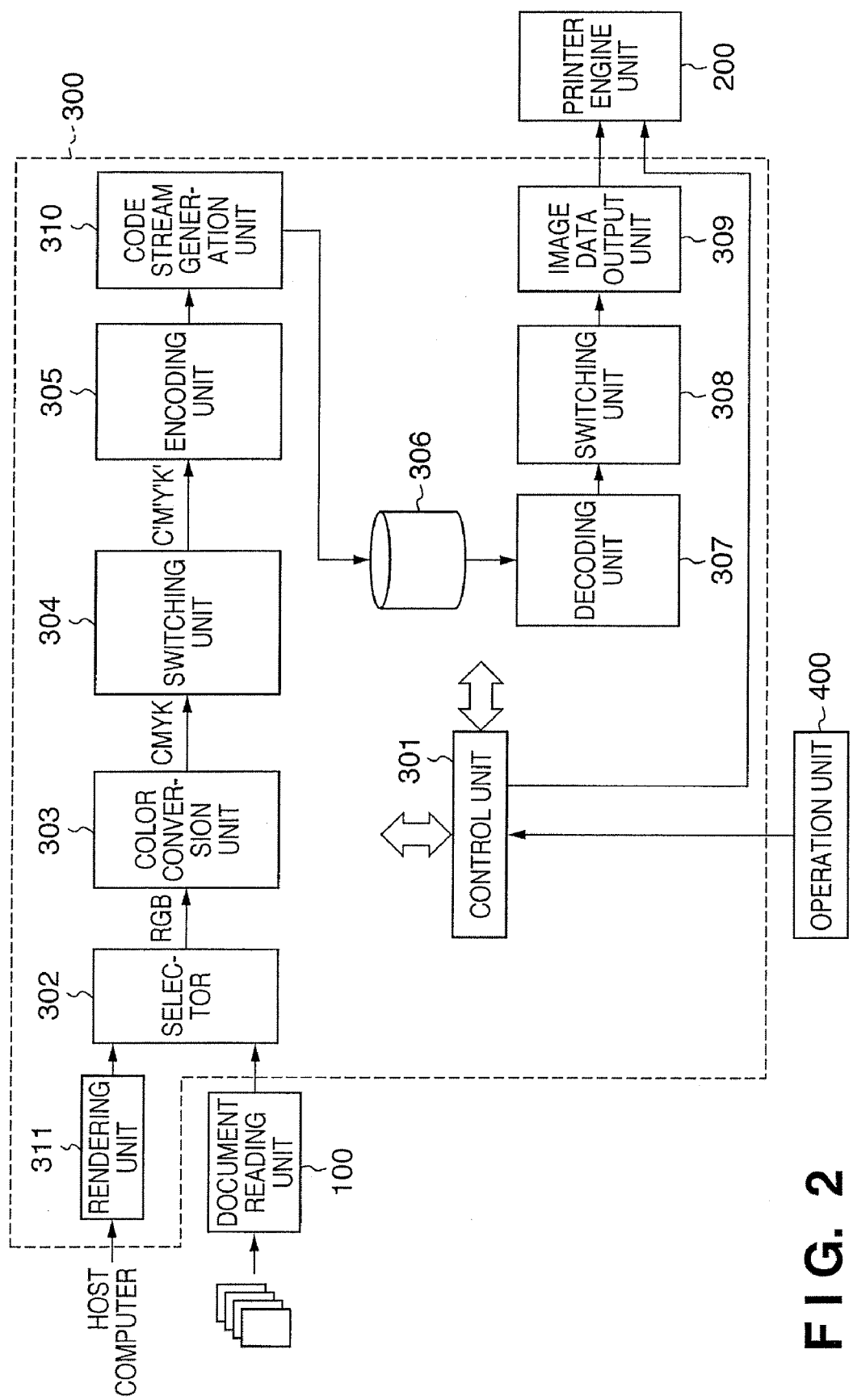
FIG. 2 is a block diagram of an image processing unit 300 in FIG. 1.

FIG. 2 is a block diagram of the image processing unit 300 in this embodiment.

The image processing unit 300 has a control unit (including a microprocessor, ROM, and RAM) 301 that controls the entire apparatus.

A rendering unit 311 interprets PDL print data received from a host computer via an interface (not shown) (including a network interface) and renders an image. Each pixel of the rendered image has three R, G, and B components each of which is expressed by 8 bits (256 tones).

A selector 302 selects one of a bitmap image output from the document reading unit 100 and that output from the rendering unit 311 and outputs the selected image.

A color conversion unit 303 converts the R, G, and B data received via the selector 302 into print color components of C (cyan), M (magenta), Y (yellow), and K (black). Generally, to convert the RGB color space into the CMYK color space, data in the RGB color space is converted first into data in a CMY color space first. Then, C, M, and Y data in the CMY color space undergo UCR (Under Color Removal) to correct the C, M, and Y data and generate a K component. The series of processes may be implemented by using an LUT (Look Up Table).

A switching unit 304 generates output C, M, Y, and K data from the four received C, M, Y, and K components in accordance with a control signal from the control unit 301 and outputs the generated data. The process of the switching unit 304 will be described later in detail.

An encoding unit 305 lossless-encodes each of the C, M, Y, and K data received from the switching unit 304. Any kind of lossless encoding is usable. The encoding unit 305 of this embodiment uses a known JPEG-LS algorithm.

JPEG is known as lossy encoding suitable for natural images. To the contrary, JPEG-LS uses an algorithm totally different from JPEG and generates lossless-encoded data, although it has a prefix "JPEG". The JPEG-LS is known as an encoding technique particularly suitable for computer graphics and character-line images.

In short, the JPEG-LS combines run-length encoding and predictive encoding. More specifically, during raster scan of a color image as an encoding target, when the number of colors contained in a plurality of already encoded pixels around a pixel of interest is 1, counting of the number of times (runs) when the immediately preceding pixel and the pixel of interest have the same color starts. When the color of the pixel of interest is different from that of the immediately preceding pixel, the run is encoded and output. When the number of colors contained in the plurality of pixels around the pixel of interest is not 1 without run-length encoding, the predicted value of each component of the pixel of interest is calculated on the basis of the neighboring pixels. The difference between the predicted value of each component and the actual component value of the pixel of interest is entropy-encoded. The JPEG-LS is known as a method of encoding image data having three components in the RGB or YCbCr color space. In this embodiment, this method is applied to four C, M, Y, and K components. The algorithm itself is the same as JPEG-LS. The idea of applying the JPEG-LS to C, M, Y, and K image data from the above explanation will readily occur to those skilled in the art, and a more detailed description will not be done.

Figure 19:
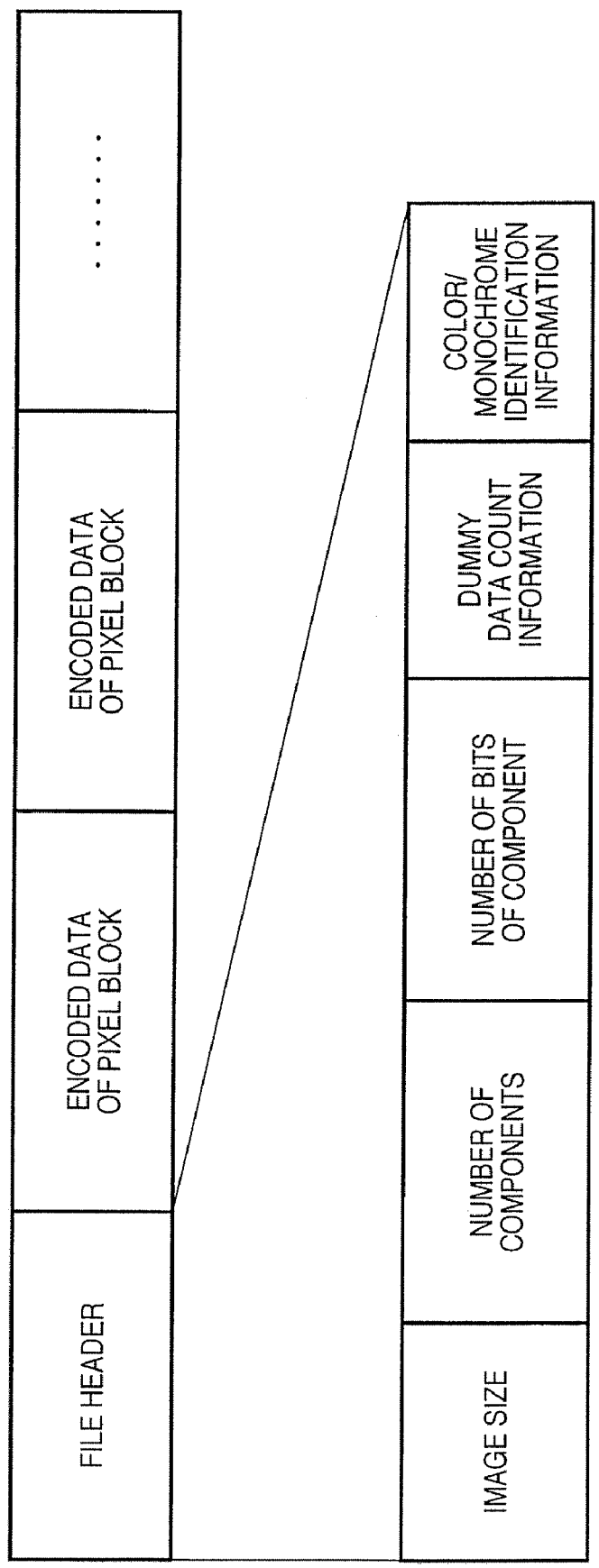
FIG. 19 is a view showing the structure of an encoded data file generated in the first embodiment.

A code stream generation unit 310 receives the encoded data from the encoding unit 305. The code stream generation unit 310 generates a header according to a control signal from the control unit 301 and stores the encoded data as a file in a mass storage device 306 together with the header. As shown in FIG. 19, the header contains an image data size (the number of horizontal pixels and the number of vertical pixels of image data), the number of components, the number of bits of each component, dummy data count information (to be described later in detail), and color/monochrome identification information (to be described later in detail).

A decoding unit 307 reads out the compression-coded image data file from the storage device 306, decodes the data, and outputs the decoding result to a switching unit 308.

The switching unit 308 is a counterpart of the switching unit 304. The switching unit 308 generates output C, M, Y, and K data from the four received C, M, Y, and K components in accordance with a control signal from the control unit 301 and outputs the generated data. The process of the switching unit 308 will be described later in detail.

An image data output unit 309 plane-sequentially outputs the C, M, Y, and K data based on the received C, M, Y, and K data in accordance with the printing process timing of the printer engine unit 200.

Normally, a copying machine executes correction processes (e.g., shading correction and gamma correction) in accordance with the characteristics of CCDs and printer engine. Note that the correction processes are irrelevant to the present invention and are not illustrated in FIG. 2.

To copy a document in the above-described arrangement, the user selects the color copy mode or monochrome copy mode by operating the operation panel 400, sets a document on (the ADF of) the document reading unit 100, and presses a copy start key. Upon detecting the press of the copy start key, the control unit 301 controls to transfer the document image data read by the document reading unit 100 to the encoding unit 305 via the selector 302 in the raster order. The image data is compression-coded by the encoding unit 305 and stored in the storage device 306.

When print data is received from an external device, the selector 302 selects the rendering unit 311. An image generated by the rendering unit 311 on the basis of the print data is compression-coded and stored in the storage device 306.

The decoding unit 307 reads out compression-coded data from the storage device 306 in accordance with the print speed of the printer engine unit 200 and decodes the image data. The decoded image data is output to the printer engine unit 200 and printed.

As described above, the process of storing compression-coded data in the storage device 306 and the process of reading out, decoding, and printing the image data are asynchronous. That is, the storage device 306 functions as a buffer placed between the image compression process and the decoding process. Consequently, the document reading/encoding process is independent of the decoding/printing process. It is therefore possible to read a number of documents at a high speed and quickly start document reading of the next job.

The overall arrangement of the apparatus according to this embodiment has been described above. The switching units 304 and 308 as a characteristic feature of this embodiment will be explained next.

To print a color image, image data in the CMYK color space is generated from image data in the RGB color space. The encoding unit 305 encodes the image data. In addition, C, M, Y, and K color images are formed on the basis of image data of C, M, Y, and K components obtained by decoding.

To print a monochrome grayscale image, an image is formed by using only the K (black) component as a print color component. That is, no image data of C, M, and Y color components are formed.

However, the encoding unit 305 of this embodiment executes encoding assuming that C, M, Y, and K image data exist. Even when a monochrome grayscale image in which only the K component is significant is to be encoded, the encoding unit 305 executes encoding assuming that C, M, and Y data are present. That is, the load on the encoding unit 305 in copying a monochrome grayscale image is the same as that when copying a color image is the copied documents have the same size.

For the sake of simplicity, only the time required for image formation will be examined while neglecting the printing paper sheet conveyance time in the printer engine unit 200.

Let Tp be the time necessary for color image formation in the printer engine unit 200. As is apparent from the above explanation, the time necessary for the printer engine unit 200 to form a monochrome image using only one component (K component) is Tp/4.

To fully enhance the capability of the printer engine unit 200, it is necessary to design the encoding unit 305 capable of encoding one color image within Tp. This is because if the encoding unit 305 takes a time equal to or more than Tp to encode one color image, the decoding unit 307 keeps waiting until image data to be decoded is stored in the storage device 306. That is, the number of printed pages per unit time is equal to or less than the capability of the printer engine unit 200.

Let Tp be the time necessary for the encoding unit 305 to encode one page of a color image. Even encoding of a monochrome grayscale image takes the time Tp. However, the printer engine unit 200 requires only Tp/4 to form a monochrome grayscale image. That is, the printer engine unit 200 exhibits only ¼ the actual capability.

To completely enhance the capability of the printer engine unit 200 even in monochrome image printing, the scan speed of the document reading unit 100 is increased to four times. In addition, the encoding unit 305 is driven at a high clock frequency to reduce the time required to encode one page of a color image to Tp/4. However, this increases the load on the encoding unit 305, and the cost inevitably rises.

In this embodiment, the encoding unit 305 and printer engine unit 200 fully exhibit their processing capabilities in printing both a color image and a monochrome grayscale image. This is implemented by causing the control unit 301 to control the switching units 304 and 308. Details will be described below.

In printing a color image, the control unit 301 issues a control signal indicating a color image print mode to the switching unit 304. Upon receiving this control signal, the switching unit 304 directly passes and outputs C, M, Y, and K component data. Encoding, decoding, and formation of a color image have been described already. In storing encoded data in the storage device 306 as a file, the code stream generation unit 310 stores, in the file header, the number of horizontal pixels and the number of vertical pixels of the color image data. The code stream generation unit 310 also stores, in the file header, the number of bits of each component, "0" as dummy data count information, and identification information indicating "color".

In printing a color image, the decoding unit 307 notifies the control unit 301 of the header of the file as the decoding target. The decoding unit 307 also decodes the encoded data on the basis of the information in the header and reconstructs C, M, Y, and K data. If the identification information from the decoding unit 307 indicates "color", the control unit 301 notifies the switching unit 308 that the print mode is a color print mode. Upon receiving this information, the switching unit 308 directly outputs the C, M, Y, and K component data decoded by the decoding unit 307 to the switching unit 308.

In printing a monochrome image, the control unit 301 issues a control signal indicating a monochrome image print mode to the switching unit 304.

Figure 3:
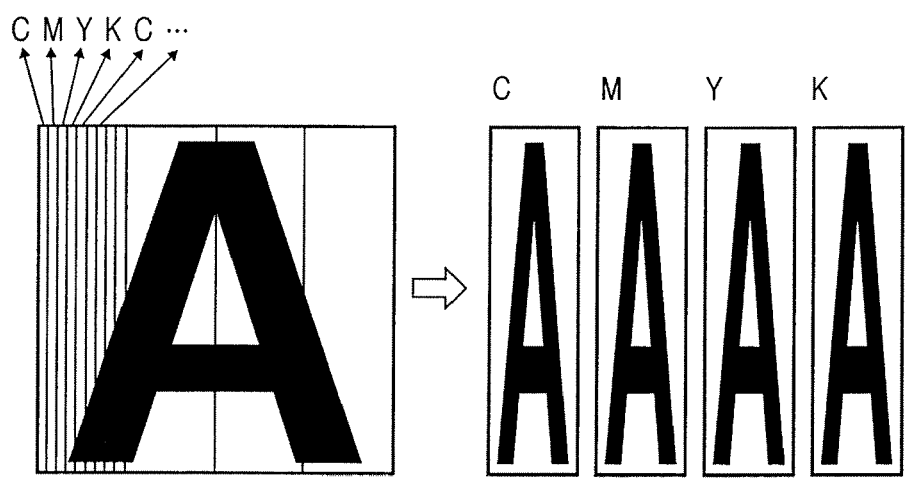
FIG. 3 is a view showing a conversion process from a monochrome image into a pseudo color image according to the first embodiment.

Upon receiving this control signal, the switching unit 304 discards (neglects) C, M, and Y data of C, M, Y, and K component data received in the raster scan order. Every time four consecutive K components are received, the switching unit 304 outputs the four data as if they were C, M, Y, and K data, as shown in FIG. 3.

Let W be the number of horizontal pixels of the received image, and H be the number of vertical pixels. The image size of each of the C, M, Y, and K components is W/4×H. It is understandable that W and H are uniquely defined by the document size and the reading resolution of the document reading unit 100.

The number of horizontal pixels of the monochrome grayscale image to be encoded is not always a multiple of 4. In such a case, dummy data is added to the end of one line. Typically, the switching unit 304 has four registers to store and hold K component data. When four K component data are stored, they are output as C, M, Y, and K components. Immediately after that, the four registers are cleared to 0. When a K component received from the color conversion unit 303 is located at the end of one line, the switching unit 304 forcibly outputs the data of the four registers even if all the four registers do not store K component data.

In storing encoded data in the storage device 306 as a file, the code stream generation unit 310 stores, in the header, W/4 as the number of horizontal pixels of the color image data and H as the number of vertical pixels. The code stream generation unit 310 also stores the number of bits of each component, dummy data count information, and identification information indicating "monochrome".

The decoding unit 307 notifies the control unit 301 of the header of the file as the decoding target. The decoding unit 307 also executes the same decoding process as that for normal color image data on the basis of the information in the header. If the identification information received from the decoding unit 307 indicates "monochrome", the control unit 301 notifies the switching unit 308 that the print mode is a monochrome print mode and of the number of dummy data. The control unit 301 also issues a request signal to the printer engine unit 200 to make only the developing unit 206K abut against the photosensitive drum 205 and execute monochrome printing. Upon receiving this notification, the switching unit 308 outputs all C, M, Y, and K data received from the decoding unit 307 as K component data. If a decoded pixel of interest is located at the end (W/4th pixel) of one line, the switching unit 308 outputs, of received four C, M, Y, and K data, remaining K component data obtained by removing dummy data.

Upon detecting that the user has designated the monochrome copy mode and input a copy start instruction, the control unit 301 issues an instruction request to the document reading unit 100 to scan at a speed four times higher than in the color copy mode. Upon receiving this request, the document reading unit 100 moves the exposure unit 122 in the sub-scanning direction at a speed 4V four times higher than in the color copy mode (FIG. 1). The document reading unit 100 also reads each color component data while raising the output clock frequency of image data from the linear CCD image sensors 124 to 126 to four times as compared to color copy.

As a result, the number of read pixels per unit time in the monochrome copy mode is four times larger than that in the color copy mode. The load on the encoding unit 305 is the same as in the color copy mode. The reason will be described below.

Figure 4A:
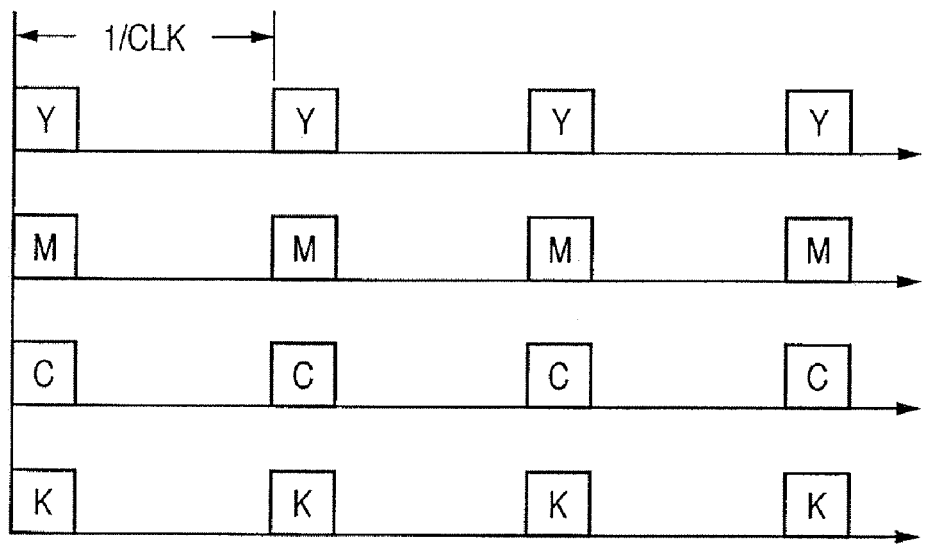
FIGS. 4A and 4B are timing charts showing the data input timings of a color image and a pseudo color image generated from a monochrome image in an encoding unit 305 in FIG. 2.

FIG. 4A shows the sequences of C, M, Y, and K data output from the color conversion unit 303 in the color copy mode. The time interval between the C, M, Y, and K data is the reciprocal of the clock of the linear CCD image sensors 124 to 126 in the color copy mode.

Figure 4B:
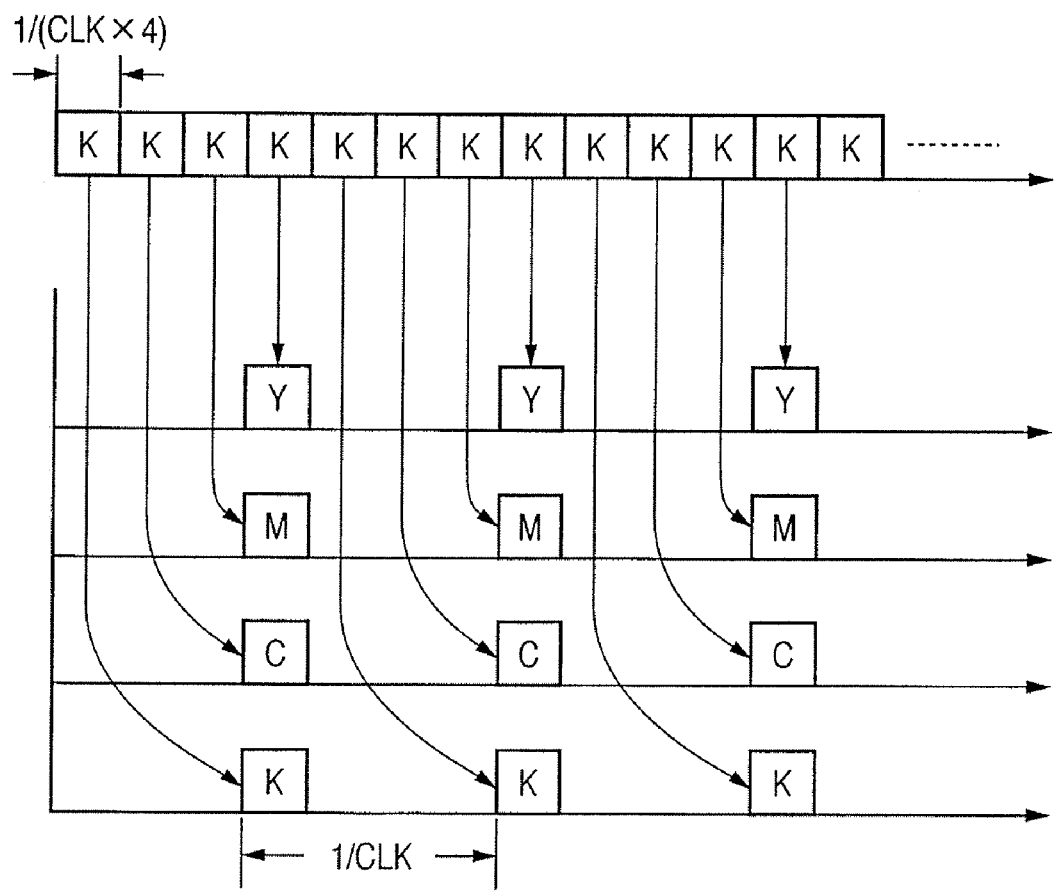

In the monochrome copy mode, the read clock from the linear CCD image sensors 124 to 126 is four times. Hence, as shown in FIG. 4B, the time interval between the K components (C, M, and Y components are not illustrated) is ¼ that in FIG. 4A, i.e., 1/(CLK×4).

Every time four K component data are input, the switching unit 304 outputs them as C, M, Y, and K data. Hence, the time interval of C, M, Y, and K data output from the switching unit 304 is the same as in FIG. 4A, i.e., 1/CLK. If the encoding unit 305 does not request simultaneous input of the C, M, Y, and K data, the switching unit 304 sequentially selects one of the C, M, Y, and K data buses and output the data every time one K data is input.

As described above, the encoding unit 305 executes encoding in accordance with the clock CLK in both the color copy mode and the monochrome copy mode. That is, the load per unit time on the encoding unit 305 does not change between a color image and a monochrome image. Under these circumstances, the time required to encode one page of monochrome grayscale image data can be ¼ that of a color image, as described above. Hence, in the monochrome print mode by the printer engine unit 200, the number of printed pages per unit time increases to four times as compared to color copy. The printer engine unit 200 can fully exhibit its performance.

As described above, according to this embodiment, it is possible to simply use the color image encoding unit 305 for encoding of a monochrome grayscale image. When the number of components of a color image to be encoded by the encoding unit 305 is N (N=4 in this embodiment), a monochrome grayscale image can be encoded in a time of almost 1/N.

The embodiment has exemplified a color image containing four components. However, the number of components may be two or more. In the example described in the embodiment, in encoding a monochrome image data, pseudo data corresponding to all components of a color image are created. However, the present invention is not limited to this. More specifically, let N be the number of color components of a color image. In the monochrome mode, the encoding speed can increase to M times (the encoding time can shorten to 1/M) as compared to a single color component process by causing the encoding unit to encode M ($2 \leq M \leq N$) consecutive data as pseudo color components. This also applies to the modifications and embodiments to be described below.

Modification to First Embodiment

In the above-described embodiment, the present invention is applied to a copying machine. An example wherein the present invention is applied to an application on an information processing apparatus such as a personal computer will be described below.

Figure 5:
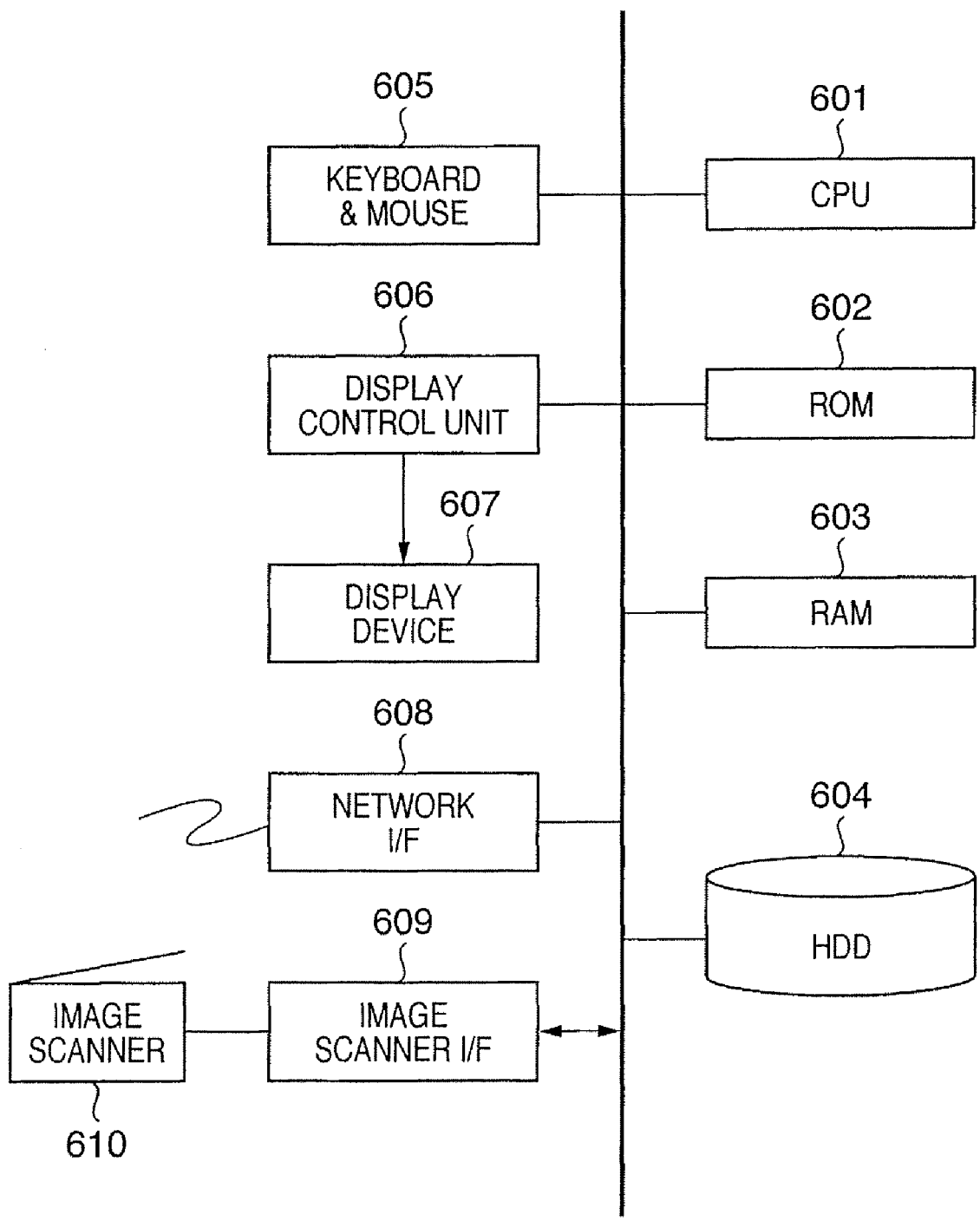
FIG. 5 is a block diagram of a computer according to a modification to the first embodiment.

FIG. 5 is a block diagram of an information processing apparatus. Referring to FIG. 5, a CPU 601 controls the entire apparatus. A ROM 602 stores a BIOS and a boot program. A RAM 603 serves as the work area of the CPU 601. A hard disk drive 604 stores an OS (Operating System) and various applications (including an application program of this modification) and holds data files created by the various applications. Reference numeral 605 denotes a keyboard & mouse. A display control unit 606 incorporates a video memory and a controller to execute rendering on the video memory and outputs a video signal to a display device 607. The display device 607 can be either a CRT display device or a liquid crystal display device. Reference numeral 608 denotes a network interface. An image scanner interface 609 for connecting an image scanner 610 typically includes a USB or SCSI interface.

When the apparatus having the above-described arrangement is powered on, the CPU 601 loads the OS (Operating System) from the hard disk drive 604 to the RAM 603 in accordance with the BIOS or boot program stored in the ROM 602. Consequently, the apparatus function as an information processing apparatus. Under the control of the OS, the CPU 601 issues various rendering process instructions or transfers bitmap data to the display control unit 606 to display a GUI on the display device 607. Under the control of the OS, the CPU 601 receives inputs from the keyboard & mouse 605 and controls the display control unit 606 on the basis of the result, thereby forming a man-machine interface.

When the user instructs to activate an image processing application, the CPU 601 loads the application program from the hard disk drive 604 to the RAM 603 and executes it.

Figure 6:
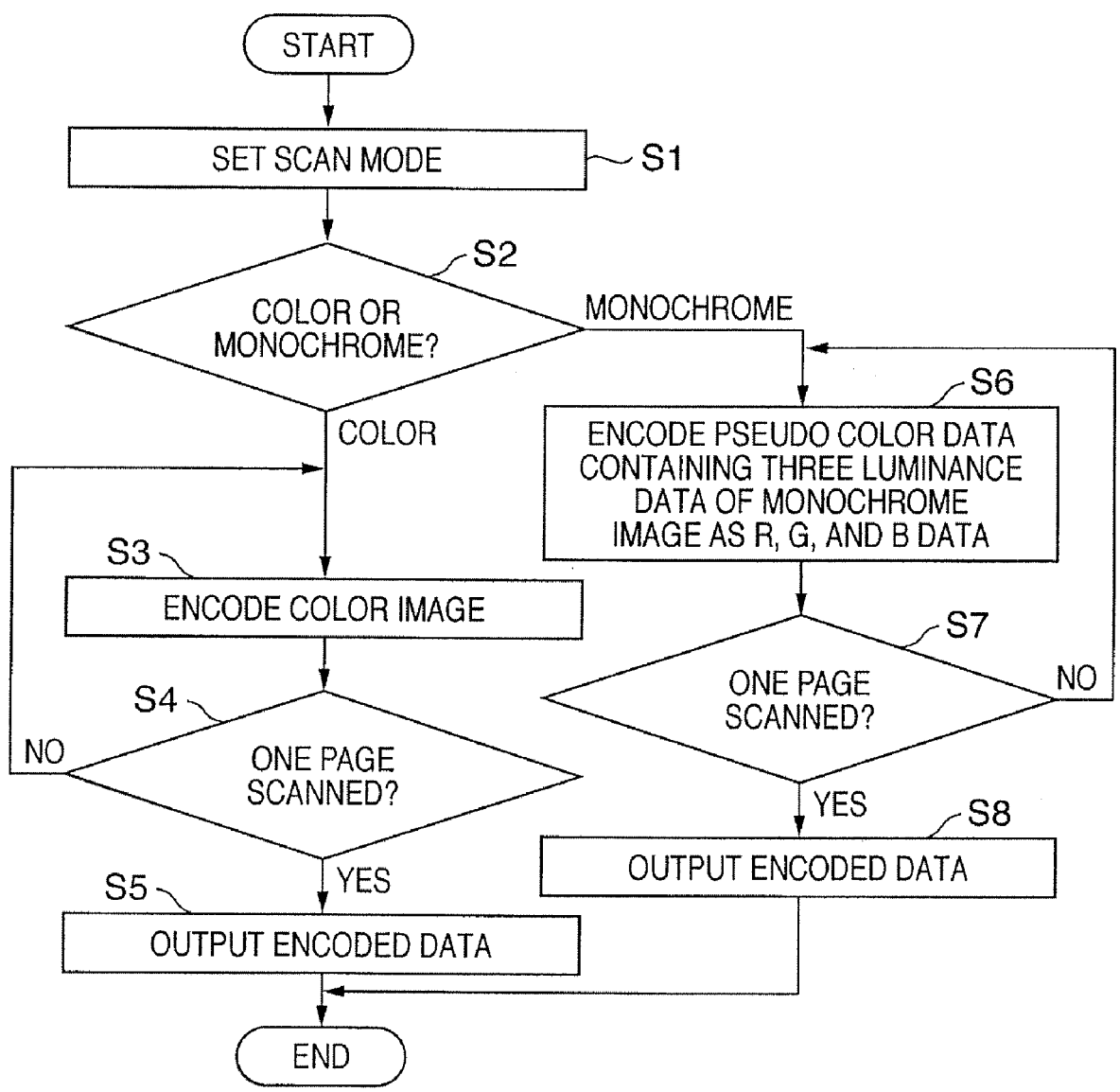
FIG. 6 is a flowchart illustrating an encoding process procedure according to the modification to the first embodiment.

The encoding process procedure of the application program of this modification will be described with reference to the flowchart in FIG. 6. Portions related to encoding and decoding in the application program will be described assuming that color image data (R, G, and B) is encoded by only JPEG-LS. Encoded data generated by the image encoding process is stored in an appropriate area of the RAM 603.

In step S1, a reading mode by the image scanner 610 is set. The reading mode is determined by displaying a GUI window (not shown) on the display device 607 and causing the user to operate the keyboard & mouse 605. The reading modes include a color reading mode and a monochrome grayscale reading mode. The document size and reading resolution may also be set.

When the reading mode is set, and the user inputs a reading start instruction, the process advances to step S2. In step S2, the CPU 601 issues the reading mode and a reading start command to the image scanner 610 via the image scanner I/F 609 and determines the set reading mode. Generally, the scan speed of the image scanner is higher in the monochrome grayscale reading mode than in the color reading mode.

If the CPU 601 determines that the set reading mode is the color reading mode, the process advances to step S3. In step S3, R, G, and B data (each expressed by 8 bits) transferred from the image scanner 610 are stored in a reception buffer ensured in the RAM 603 and also transferred to a JPEG-LS encoding function to lossless-encode the color image data.

The process in step S3 is repeated until it is determined in step S4 that the data of the final pixel of one page is input.

When one page is encoded, the RAM 603 stores the encoded data of one page of the color image data. In step S5, an appropriate header (same information as in the first embodiment) is added to the encoded data stored in the RAM 603. The data is stored in the HDD 604 as a file.

If the CPU 601 determines in step S2 that the reading mode is the monochrome grayscale reading mode, the process advances to step S6. In step S6, every time three luminance component data (each having 8 bits) transferred from the image scanner 610 are received, the three data are transferred to a JPEG-LS encoding function as R, G, and B components to lossless-encode the image data.

The process in step S6 is repeated until it is determined in step S7 that the data of the final pixel of one page is input.

When one page is encoded, the RAM 603 stores the encoded data of one page of the color image data. In step S8, an appropriate header (same information as in the first embodiment) is added to the encoded data stored in the RAM 603. The data is stored in the HDD 604 as a file.

In the first embodiment, image data as an encoding target contains four C, M, Y, and K components. In this modification, however, image data contains three, R, G, and B components. Hence, the header stores W/3 as the number of horizontal pixels of the color image data, H as the number of vertical pixels, the number of bits of each component, dummy data count information, and identification information indicating "monochrome".

Figure 7:
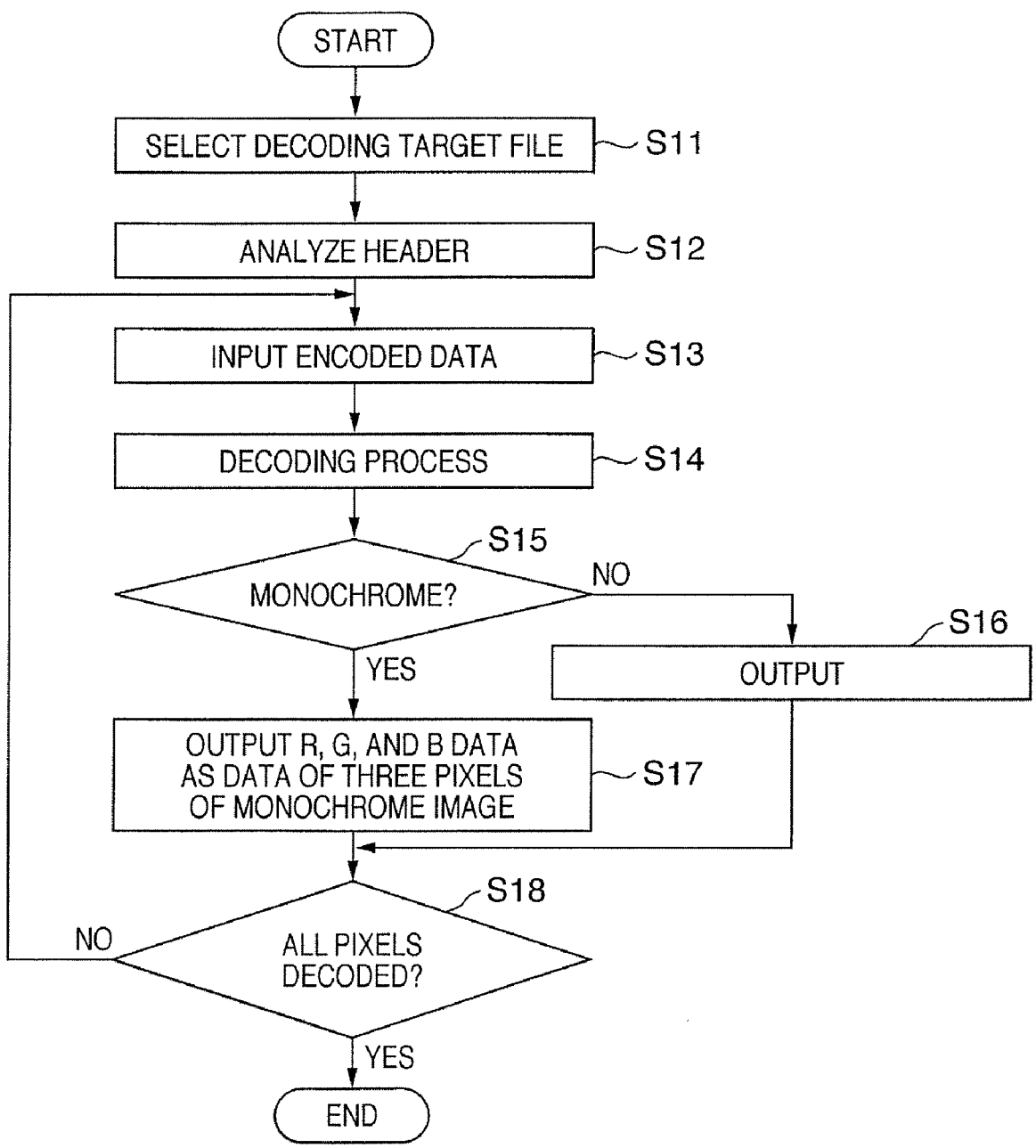
FIG. 7 is a flowchart illustrating a decoding process procedure according to the modification to the first embodiment.

A decoding process will be described next with reference to the flowchart in FIG. 7.

In step S11, an appropriate GUI of a file list is displayed. The process waits until the user selects a file as a decoding target and clicks on a decoding start button (not shown) on the GUI.

When a decoding start instruction is input, the process advances to step S12 to analyze the header of the selected file to acquire information necessary for decoding.

The process advances to step S13 to read out encoded data from the selected file. In step S14, a JPEG-LS decoding process is executed.

In step S15, it is determined whether the identification information in the header of the selected file indicates "monochrome" or "color". If the identification information indicates "color", the process advances to step S16 to directly output the decoding result. To display the decoding result, it is output to the RAM 603. The image data obtained by decoding and stored in the RAM 603 is transferred to the video memory in the display control unit 606. To store the decoding result as a file, it is stored in the HDD 604 as part of a new file.

If it is determined in step S15 that the identification information indicates "monochrome", the process advances to step S17 to rearrange {R, G, and B} data obtained by decoding to three luminance signals and output them. If the output target is the display device, R, G, and B data are necessary for each pixel. Hence, in the display mode, one luminance value is copied to three R, G, and B components and output.

The process from step S13 is repeated until it is determined in step S18 that decoding of the image of one page is ended.

As described above, even this modification can provide the same functions and effects as in the first embodiment. That is, it is possible to encode both a color image and a monochrome grayscale image by using a color image encoding function program (subroutine). When the number of components of a color image is N, the time required to encode a monochrome grayscale image can shorten to 1/N at maximum.

Second Embodiment

In the first embodiment and its modification, JPEG-LS is used as a lossless encoding technique. JPEG-LS partially uses run-length encoding in the encoding process. Run-length encoding is efficient when pixels of the same color continue in the scan direction (horizontal direction). In the first embodiment and its modification, however, in encoding a monochrome grayscale image, a pixel having four or three pseudo components is generated in correspondence with every four or three pixels. Hence, the probability that pseudo color pixels with the same value continue in the horizontal direction is low. That is, the compression ratio of a monochrome grayscale image is low.

Figure 8:
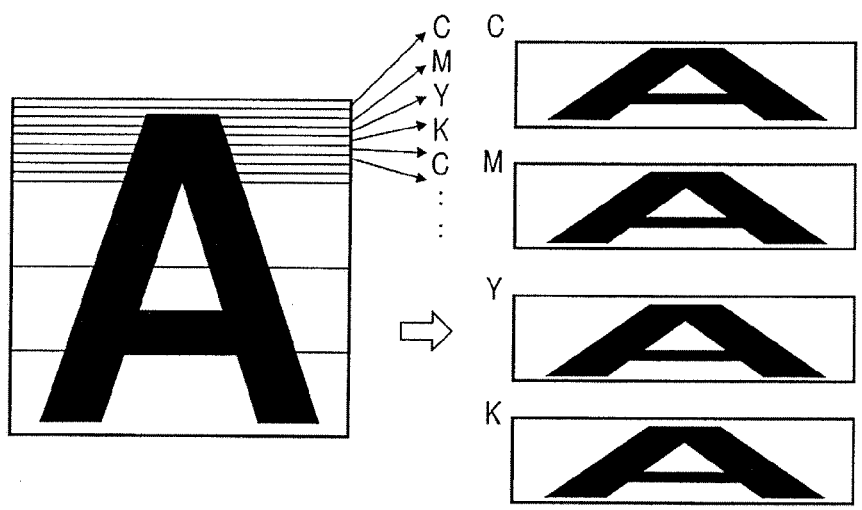
FIG. 8 is a view showing a conversion process from a monochrome image into a pseudo color image according to the second embodiment.

In the second embodiment, as shown in FIG. 8, data at the same main scanning coordinates in four horizontal lines of a grayscale image are output to an encoding unit 305 as pseudo C, M, Y, and K color components, thereby encoding the image data.

The apparatus arrangement of the second embodiment is the same as in the first embodiment. However, a switching unit 304 incorporates at least three line buffers. In a color copy mode, four received component data are directly output. In a monochrome copy mode, the switching unit 304 stores, in the line buffers, K component data (C, M, and Y components are neglected) of three lines output from a color conversion unit 303. Upon receiving the K component of the fourth line, the switching unit 304 synchronously reads out the three K components from the three line buffers. The switching unit 304 outputs, to the encoding unit 305, the just received K component and the three readout K components, i.e., a total of four K component data as pseudo C, M, Y, and K component data.

If the number H of vertical pixels of the encoding target image data is not a multiple of 4, dummy line data is output, and information representing the number of lines of the dummy data is stored in the final header. In each of the pseudo C, M, Y, and K components, the number of vertical pixels is ¼ that of the original image. In the second embodiment, the load per unit time on the encoding unit 305 in the monochrome copy mode is almost the same as in the monochrome copy mode of the first embodiment. H/4 is set as the number of vertical pixels in the header of a file stored in a storage device 306.

A switching unit 308 also incorporates appropriate line buffers. In the color copy mode, the switching unit 308 directly outputs a decoding result from a decoding unit 307, as in the first embodiment. In the monochrome copy mode, when pseudo C, M, Y, and K data corresponding to one line are decoded, the switching unit 308 outputs them as K components corresponding to four lines.

The second embodiment has been described above.

It is also possible to implement the process of the second embodiment by using a computer program, as in the modification to the first embodiment, as is apparent from the above description.

Third Embodiment

The second embodiment raises the run-length encoding efficiency. However, lossless encoding includes not only run-length encoding but also predictive encoding. In encoding based on a reference window of predictive encoding or auto-correlation considering rotation, the horizontal to vertical aspect ratio of an encoding target image falls out of balance, and the encoding efficiency lowers at a high probability.

In the predictive encoding method, normally, a preceding, upper, upper left, or upper right reference window (symmetrical in the horizontal and vertical directions) is used for a pixel of interest. If there is a deviation from an aspect ratio assumed by the window, a calculated predicted value contains an error, and the prediction error becomes large. It is therefore understandable that in using predictive encoding, the process of the first or second embodiment makes the aspect ratio of pseudo C, M, Y, and K images fall out of balance, and the compression ratio becomes lower at a high probability.

Figure 9:
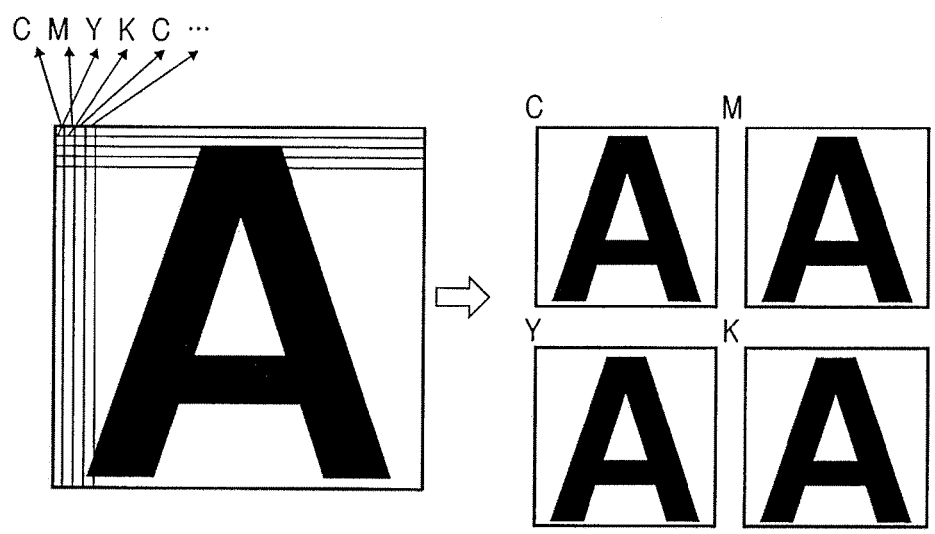
FIG. 9 is a view showing a conversion process from a monochrome image into a pseudo color image according to the third embodiment.

In the third embodiment, as shown in FIG. 9, in a monochrome copy mode, four, 2×2 K component data in a two-dimensional 2×2 window are encoded as one pixel having four components.

For this purpose, a switching unit 304 incorporates a memory corresponding to two lines. In a monochrome copy mode, when K data of two lines are stored, 2×2 K components are read out and output to an encoding unit 305 as pseudo C, M, Y, and K components. In storing encoded data in a storage device 306, W/2 and H/2 are stored in the file header as image sizes.

A switching unit 308 also incorporates an appropriate memory. In printing a page in the monochrome copy mode, when pseudo C, M, Y, and K data of two lines are stored, the switching unit 308 outputs four component data of one pseudo pixel as four K components.

As described above, the third embodiment can provide the same functions and effects as in the first and second embodiments when the encoding unit 305 employs the predictive encoding method.

Fourth Embodiment

In the above-described first embodiment and its modification and the second and third embodiments, the encoding unit 305 executes lossless encoding.

When an original image (an image read by a document reading unit 100 or an image obtained by rendering) is a color natural image, the compression ratio can be raised by encoding the data while cutting components with small influence on the human visual sense. That is, even when lossy encoding is executed for a color natural image, the deterioration of quality of a finally output (printed) image is negligible.

On the other hand, a grayscale image is converted into a pseudo color image, as described above. If such a grayscale image is lossy-encoded, it is impossible to reconstruct the original grayscale image.

In the fourth embodiment, an encoding unit 305 adaptively selects lossy encoding or lossless encoding when the original image is a color image. If the original image is a grayscale image, the encoding unit 305 executes lossless encoding.

The apparatus arrangement is the same as in FIGS. 1 and 2, and a description thereof will not be repeated. That is, switching units 304 and 308 perform the same operations as in one of the first to third embodiments. Note that the C, M, Y, and K components of one pixel data input to an input unit 501 literally correspond to the components of one pixel of the original image or are pseudo components generated from four K components of a grayscale image.

In the fourth embodiment, the encoding unit 305 that implements the above-described function needs to be explained on the basis of its arrangement. The arrangement of the encoding unit 305 according to the fourth embodiment is shown in FIG. 10 and will be described below.

Figure 10:
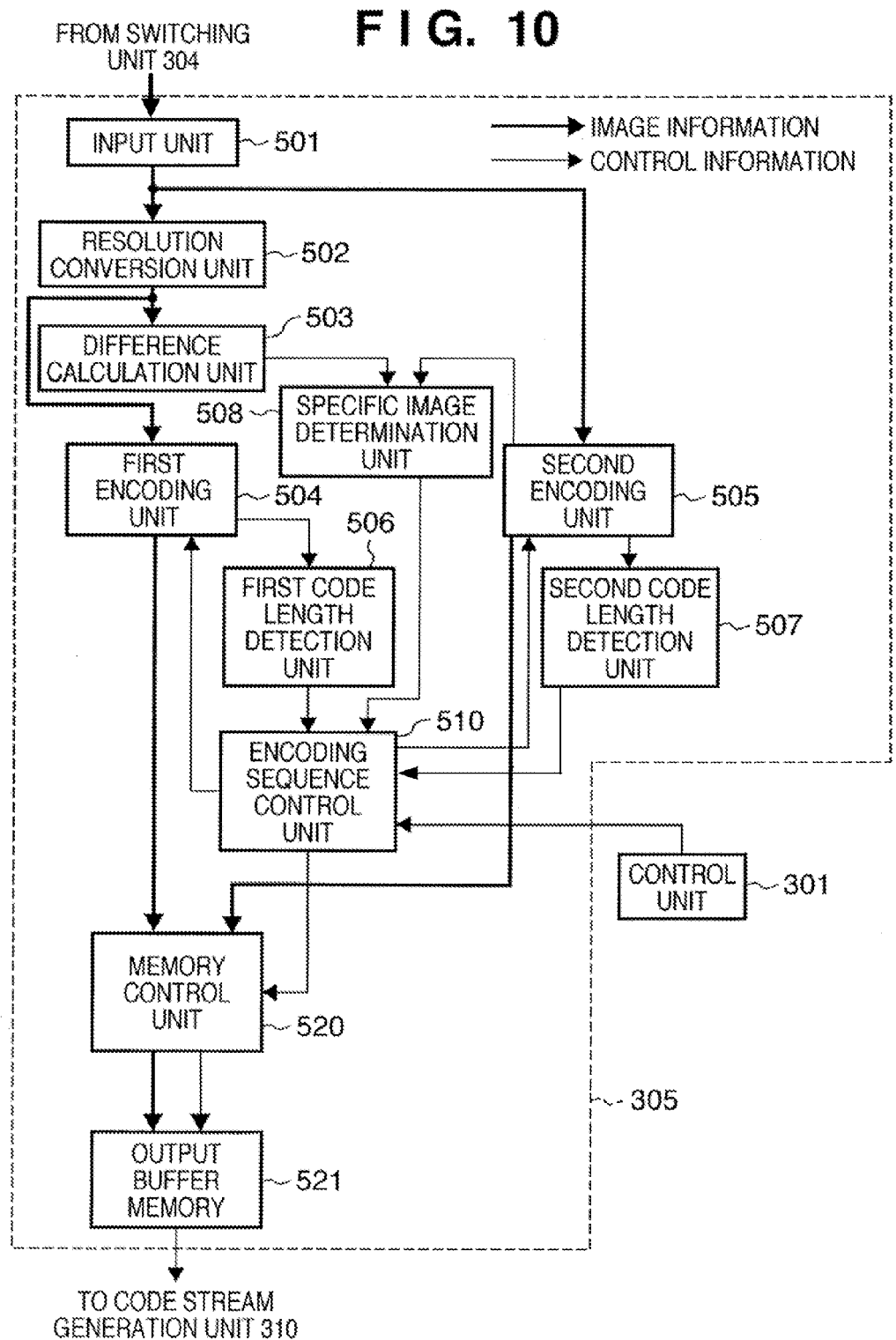
FIG. 10 is a block diagram of an encoding unit 305 according to the fourth embodiment.

Referring to FIG. 10, the input unit 501 incorporates a line buffer memory corresponding to a plurality of lines. As described above, the input unit 501 receives image data from the switching unit 304 in the raster order, stores them in the internal line buffers, and outputs N×M pixel blocks (16×16 pixel blocks in this embodiment).

A resolution conversion unit 502 converts the number of pixels of a pixel block (16×16 pixel data) received from the input unit 501 into a ½ size in both the horizontal and vertical directions. That is, the resolution conversion unit 502 converts 16×16 pixel data into 8×8 pixel data. This conversion is done by obtaining average values Cave, Mave, Yave, and Kave of the components of 2×2 pixels in a pixel block and generating a pixel having the average values as components. Any other resolution conversion algorithm may be employed (e.g., nearest neighbor method).

A difference calculation unit 503 obtains difference information D between the image data of 8×8 pixels after resolution conversion and the image data of 16×16 pixels before resolution conversion.

Let V( ) be the pixel value after resolution conversion and V'( ) be the pixel value before resolution conversion. The difference information D is given by $$D=\Sigma|V(i,j)-V'(2i,2j)|+|V(i,j)-V'(2i,2j+1)|+|V(i,j)-V'(2i+1,2j)|+|V(i,j)-V'(2i+1,2j+1)| \quad (1)$$

(where $\Sigma$ is the sum of i,j=0, 1, 2, ..., 7)

Actually, the difference calculation unit 503 calculates equation (1) for each component. In this embodiment, there are four C, M, Y, and K color components. The difference calculation unit 503 obtains D(C), D(M), D(Y), and D(K) of the components in accordance with equation (1). The sum D(C)+D(M)+D(Y)+D(K) is output to a specific image determination unit 508 as difference information Dt.

A first encoding unit 504 is a lossy encoding unit. In the fourth embodiment, the first encoding unit 504 employs a JPEG encoding method. That is, the first encoding unit 504 executes DCT, quantization, and entropy encoding of the 8×8 pixel data output from the resolution conversion unit 502 and outputs the generated encoded data to a memory control unit 520. The first encoding unit 504 outputs the encoded data after adding an identification bit indicating lossy-encoded data to the start of the data. JPEG encoding is known as an encoding method suitable for a natural image.

When the first encoding unit 504 outputs the encoded data (including the identification bit) to the memory control unit 520, a first code length detection unit 506 detects the encoded data amount and outputs the detection result to an encoding sequence control unit 510.

A second encoding unit 505 lossless-encodes the 16×16 pixel data received from the input unit 501, unlike the first encoding unit 504. The original 16×16 pixel data can completely be reconstructed by lossless encoding. In the fourth embodiment, the second encoding unit 505 employs JPEG-LS. JPEG and JPEG-LS are completely different, as described above.

However, in JPEG-LS encoding the 16×16 pixel data, the second encoding unit 505 of the fourth embodiment calculates a run ratio Rr and a two-color ratio Cr from the image data and outputs them to the specific image determination unit 508. The method of calculating the run ratio Rr and two-color ratio Cr will be described below.

Figure 11:
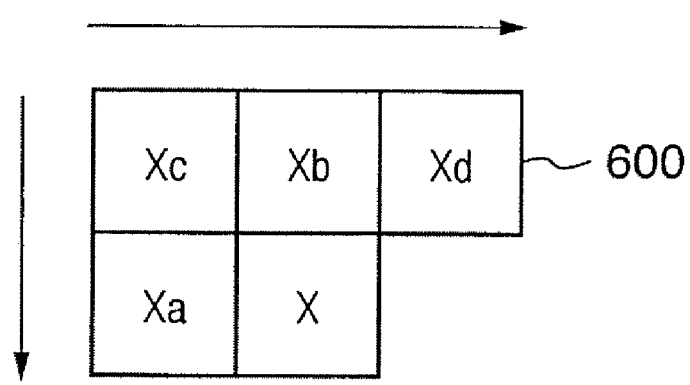
FIG. 11 is a view showing a reference window in a lossless encoding process.

During raster scan of the image data of 16×16 pixels, the second encoding unit 505 detects the colors of a pixel X of interest and neighboring pixels Xa, Xb, Xc, and Xd which are located around the pixel X of interest and have already undergone encoding by using a window 600 shown in FIG. 11. When the number of colors contained in the neighboring pixels Xa, Xb, Xc, and Xd is "1", i.e., Xa=Xb=Xc=Xd, the second encoding unit 505 starts counting the number of times (runs) when the pixel X of interest and the immediately preceding pixel Xa have the same color. Run counting finishes when X≠Xa, or the pixel X of interest has reached the end of the line. When run counting is ended, a code word corresponding to the counted runs is output. When the number of colors contained in the neighboring pixels Xa, Xb, Xc, and Xd is not "1" without run-length encoding, the second encoding unit 505 obtains the predicted value of the pixel X of interest by using the neighboring pixels Xa, Xb, Xc, and the like. The second encoding unit 505 Huffman-encodes the difference between the predicted value and the actual value of the pixel of interest and outputs a code word.

In this embodiment, the ratio of run-length-encoded pixels of the 16×16 pixel data is obtained as the run ratio Rr by using the above-described process.

$Rr$=total number of run-length-encoded pixels/256

The run ratio Rr is used as an index representing whether the number of run-length-encoded pixels is large or small, as will be described later. Hence, the run ratio Rr may actually be $Rr$=total number of run-length-encoded pixels As described above, the second encoding unit 505 detects the number of colors of the neighboring pixels Xa, Xb, Xc, and Xd around the pixel X of interest during the encoding process. In this embodiment, the number F of times when the number of colors contained in the neighboring pixels Xa, Xb, Xc, and Xd is "2" is counted, thereby obtaining the two-color ratio Cr.

$Cr=F/256$

The two-color ratio Cr is also used as an index representing the frequency of the two colors, as will be described later. Hence, the two-color ratio Cr may actually be $$Cr=F$$

Two colors are detected when, e.g., $Xa \neq Xb=Xc=Xd$ or $Xa=Xd \neq Xb=Xc$.

The specific image determination unit 508 determines on the basis of the difference information Dt from the difference calculation unit 503 and the run ratio Rr and two-color ratio Cr from the second encoding unit 505 whether the pixel block of interest has the property of a specific image pattern. The determination result is output to the encoding sequence control unit 510 as determination information Dp. More specifically, the specific image determination unit 508 determines that the pixel block of interest has the property of a specific image when the following condition is satisfied.

$$\text{Condition: } Dt>Th1, \text{ and } Rr>Th2, \text{ and } Cr<Th3 \qquad (2)$$

where Th1, Th2, and Th3 are preset threshold values which can be changed in accordance with the use environment as needed (for example, combination candidates of Th1 to Th3 are displayed on the operation panel, and the user selects one of them).

Figure 12:
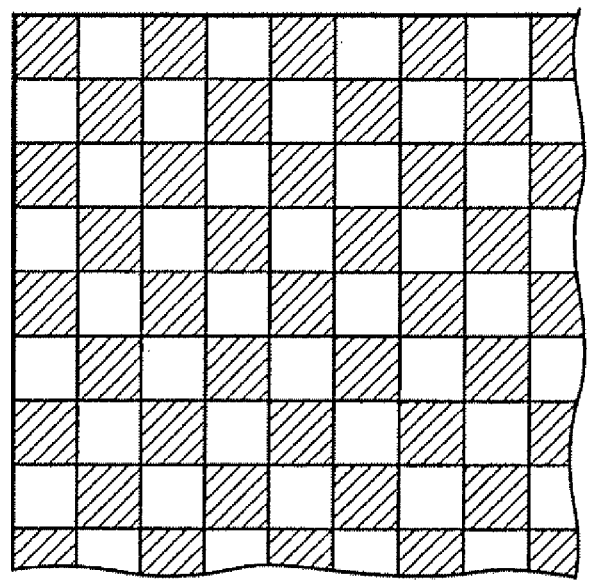
FIG. 12 is a view showing a typical example of a specific pattern according to the fourth embodiment.

In a typical image that satisfies the above condition, high-density pixels and low-density pixels are alternately arrayed, as shown in FIG. 12. When the resolution of such an image is converted into ½ in both the horizontal and vertical directions, the pixel values are averaged, and the difference from the original image becomes large. Hence, in this image, the difference information Dt has a large value. It is understandable that the two-color ratio Cr has a value close to 100%, and the run ratio Rr has a value close to 0%.

Conversely, in a natural image, the colors of adjacent pixels are slightly different. However, the difference is small. The difference information Dt is inevitably small. The two-color ratio Cr and run ratio Rr vary within appropriate ranges. Hence, the image does not satisfy the above condition.

If such pixels of two colors, e.g., white and black alternate to form an image for a purpose of halftone expression, encoded data after resolution conversion can be selected without any serious problem. Even a document image in which relatively small character images are arrayed or a line image including many lines per unit area can also have a state close to that shown in FIG. 12. If such a character-line image undergoes resolution conversion, the density at the boundary between character images or line images becomes intermediate. Since the edges of images are unclear, the readability undesirably becomes poor.

In this embodiment, when the user selects the color copy mode by operating an operation panel 400, he/she can give priority to lossless encoding or lossy encoding for an image area having the propriety of a specific pattern as described above. A control unit 301 notifies the encoding sequence control unit 510 of the setting information. If the user selects the monochrome copy mode, lossless-encoded data is selected unconditionally.

The encoding sequence control unit 510 according to the fourth embodiment determines the pixel block of interest on the basis of the information from the first code length detection unit 506, second code length detection unit 507, specific image determination unit 508, and control unit 301.

The memory control unit 520 receives the determination result from the encoding sequence control unit 510, selects one of the lossy-encoded data from the first encoding unit 504 and the lossless-encoded data from the second encoding unit 505, and stores the selected data in an output buffer memory 521. When the output buffer memory 521 stores encoded data of one page, the memory control unit 520 outputs the encoded data to a code stream generation unit 310.

The determination process of the encoding sequence control unit 510 according to the fourth embodiment will be described here in more detail.

[In Color Copy Mode]

A case wherein the encoding sequence control unit 510 receives, from the control unit 301, a color copy mode notification and information representing that priority is given to lossless encoding.

In the following explanation, let LH be the code length of lossy-encoded data detected by the first code length detection unit 506, and LK be the code length of lossless-encoded data detected by the second code length detection unit 507. When the condition (2) is satisfied, the specific image determination unit 508 outputs a determination signal Dp=1 to the encoding sequence control unit 510. When the condition (2) is not satisfied, the specific image determination unit 508 outputs a determination signal Dp=0 to the encoding sequence control unit 510.

The encoding sequence control unit 510 determines encoded data to be output to the output buffer memory 521 in the following way.

<When Dp=1>

The encoding sequence control unit 510 determines to output the priority-designated lossless-encoded data (encoded data obtained by the second encoding unit 505) to the output buffer memory 521. Until encoding of one page finishes, the selection target is fixed without changing.

<When Dp=0>

When LH<LK, the encoding sequence control unit 510 determines to output the lossy-encoded data (encoded data obtained by the first encoding unit 504) to the output buffer memory 521.

When LH≧LK, the encoding sequence control unit 510 determines to output the lossless-encoded data (encoded data obtained by the second encoding unit 505) to the output buffer memory 521.

As a result, in the color image copy mode, lossless-encoded data and lossy-encoded data never mix in an image area having the property of a specific pattern. This suppresses unnatural block noise that is generated at the boundaries between pixel blocks by the difference between the encoding methods. If setting is done to give priority to lossless-encoded data, it is guaranteed to actually maintain the quality of the original image. For a pixel block without the propriety of a specific pattern, data with a smaller code amount (code length) is selected from lossy-encoded data and lossless-encoded data after resolution conversion to ½. This enables to increase the encoding efficiency.

A process in the color copy mode has been described above. The copying machine of this embodiment also has a function of receiving PDL print data from a host computer and printing it, as shown in FIG. 2. Normally, when the host computer is generating print data, a printer driver running on the host computer describes "color printing" or "monochrome printing" in the print data. The rendering unit 311 determines in a rendering process whether a page is color or monochrome and notifies the control unit 301 of it. The printer driver on the host computer displays a GUI in which the user can select lossless encoding or lossy encoding as a priority (lossless encoding is set as a priority in default). The printer driver also describes the selection contents in the print data. The rendering unit 311 notifies the control unit 301 of the selection information. This also applies to the monochrome copy mode to be described below.

[In Monochrome Copy Mode]

A case wherein the encoding sequence control unit 510 receives a monochrome copy mode notification from the control unit 301 will be described next.

In the monochrome copy mode, four, C, M, Y, and K components contained in one pixel received by the input unit 501 are pseudo data. In fact, the C, M, Y, and K component data are four consecutive K component data.

Hence, in the monochrome copy mode, the encoding sequence control unit 510 neglects information from the specific image determination unit 508, first code length detection unit 506, and second code length detection unit 507. The encoding sequence control unit 510 determines to output the lossless-encoded data (encoded data obtained by the second encoding unit 505) to the output buffer memory 521.

Let W be the number of horizontal pixels of a document read by the document reading unit 100, and H be the number of vertical pixels.

If the fourth embodiment is based on the first embodiment, the switching unit 304 generates C, M, Y, and K data in the form shown in FIG. 3 from a grayscale image (image containing only the K component). Hence, the encoding unit 305 of the fourth embodiment lossless-encodes a pseudo color image whose number of horizontal pixels is W/4 and whose number of vertical pixels is H.

If the fourth embodiment is based on the second embodiment, the switching unit 304 generates C, M, Y, and K data in the form shown in FIG. 8 from a monochrome grayscale image. Hence, the encoding unit 305 of the fourth embodiment lossless-encodes a pseudo color image whose number of horizontal pixels is W and whose number of vertical pixels is H/4.

If the fourth embodiment is based on the third embodiment, the switching unit 304 generates C, M, Y, and K data in the form shown in FIG. 9 from a monochrome grayscale image. Hence, the encoding unit 305 of the fourth embodiment lossless-encodes a pseudo color image whose number of horizontal pixels is W/2 and whose number of vertical pixels is H/2.

In any case, in storing a file in the storage device 306, the header of the encoded data of the monochrome grayscale image stores image size information corresponding to one of the first to third embodiments.

A decoding unit 307 of the fourth embodiment has a function of reading out a file containing both lossless-encoded data and lossy-encoded data and decoding it.

The header of each pixel block is analyzed. If the identification information indicates lossless-encoded data, the decoding unit 307 decodes it by the JPEG-LS method. If the identification information indicates lossy-encoded data, the decoding unit 307 decodes it by JPEG method. Since the image size of the decoding result of one pixel block is 8×8 pixels, the resolution must be converted into 16×16 pixels. This conversion can be done by linear interpolation. Note that the identification information in the header of the encoded data indicates lossless-encoded data in all pixels of a file created in the monochrome copy mode. If the color/monochrome identification information in the file header indicates "monochrome", the decoding unit 307 notifies the switching unit 308 of it, as already described in the first to third embodiment.

When being notified by the decoding unit 307 that the color/monochrome identification information indicates "monochrome", the switching unit 308 rearranges the C, M, Y, and K data from the decoding unit 307 into four K component data and outputs them.

As described above, according to the fourth embodiment, for a color image including a natural image, the encoding unit adaptively selects lossless encoding or lossy encoding for each pixel block, thereby increasing the compression ratio of the image of one page. For an image area having the propriety of a specific pattern, only one of lossless-encoded data and lossy-encoded data is selected during the encoding process of at least one page. It is therefore possible to prevent unnatural noise at the boundaries between pixel blocks. For a monochrome grayscale image, the color image encoding unit can efficiently be used. When the number of color components of a color image is N, a monochrome grayscale image having the same size as a color image can be encoded in a time of 1/N.

In the fourth embodiment, a color image as an encoding target is expressed by four C, M, Y, and K components. However, it may be expressed three components of R, G, and B or Y, Cb, and Cr. When printing is done by using a printer engine, R, G, and B or Y, Cb, and Cr color image data obtained by decoding are converted into print color components of C, M, and Y or C, M, Y, and K.

First Modification to Fourth Embodiment

In the fourth embodiment, the present invention is applied to a copying machine or a printing apparatus. The encoding process and decoding process corresponding to the fourth embodiment may be applied to an application program executed on a general-purpose information processing apparatus such as a personal computer.

In this case, the apparatus arrangement can be the same as in FIG. 5. The encoding process and decoding process of an application program (stored in an HDD 604) executed by a CPU 601 will be described with reference to the flowcharts in FIGS. 13 to 15. In this modification, image data expressed by three R, G, and G components is encoded in a color encoding process, for the descriptive convenience. In a monochrome reading mode, three luminance data are rearranged into pseudo R, G, and B data and encoded.

Figure 13:
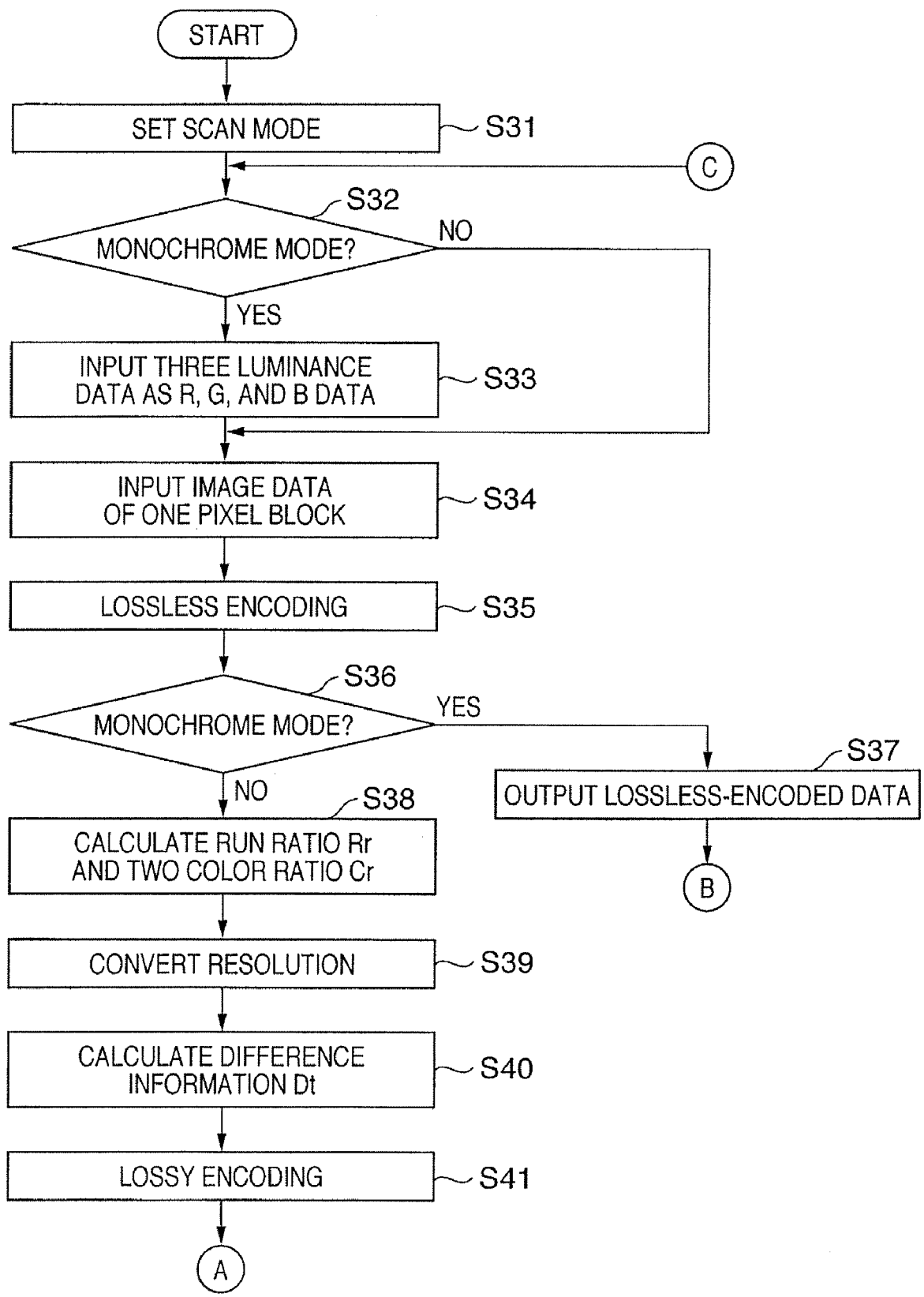
FIG. 13 is a flowchart illustrating an encoding process procedure according to the first modification to the fourth embodiment.

The encoding process will be described with reference to the flowcharts in FIGS. 13 and 14.

In step S31, a reading mode by an image scanner 610 is set. The reading mode is determined by displaying a GUI window (not shown) on a display device 607 and causing the user to operate a keyboard & mouse 605. The reading modes include a color reading mode and a monochrome grayscale reading mode. The document size and reading resolution may also be set.

When the reading mode is set, and the user inputs a reading start instruction, the process advances to step S32. In step S32, the CPU 601 issues the reading mode and a reading start command to the image scanner 610 via an image scanner I/F 609 and determines the set reading mode. Generally, the scan speed of the image scanner is higher in the monochrome grayscale reading mode than in the color reading mode.

If the CPU 601 determines that the set reading mode is the monochrome reading mode, the process advances to step S33. In step S33, three luminance component data (each having 8 bits) transferred from the image scanner 610 are received as pseudo R, G, and B data and stored in a reception buffer in a RAM 603. If the reading mode is a color reading mode, R, G, and B data received from the image scanner 610 are directly stored in the reception buffer.

In step S34, data of one pixel block (16×16 pixels) is received from the reception buffer. In step S35, the data is lossless-encoded to generate lossless-encoded data. The generated encoded data is temporarily stored in an appropriate area of the RAM 603. The RAM 603 also stores, as flags, the position of a pixel of interest where the number of colors contained in referred neighboring pixels is 2 during the lossless encoding and the position of a pixel of interest when run-length encoding is executed.

In step S36, it is determined whether the reading mode is a monochrome reading mode.

A case wherein the reading mode is a monochrome reading mode will be described here. If it is determined that the reading mode is a monochrome reading mode, the generated lossless-encoded data is the encoding result of a pixel block of pseudo R, G, and B data. Hence, the lossy encoding process and feature parameter calculation process to be described later are unnecessary. The lossless-encoded data is output to a buffer ensured in the RAM 603.

The process advances to step S47 to determine whether all pixel blocks are encoded. If NO in step S47, the process from step S32 is repeated. If all pixel blocks are encoded, the process advances to step S48 to store the data in the HDD 604 as a file. Let W be the number of horizontal pixels of the read document image, and H be the number of vertical pixels. The size of each plane of the pseudo R, G, and B data is given by W/3×H. The file header stores the horizontal image size W/3 and the vertical image size H. If dummy data is present, dummy data count information and identification information indicating "monochrome" are stored in the header.

A case wherein the reading mode is a color reading mode will be described next.

In the color reading mode, the process advances from step S36 to step S38. In step S38, the flags stored in the RAM 603 during lossless encoding are checked, and the run ratio Rr and two-color ratio Cr are calculated.

In step S39, the pixel block (16×16 pixel data) input in step S34 is converted into a resolution of ½ in both the horizontal and vertical directions. In step S40, the difference information Dt between the image of the 16×16 pixel block before resolution conversion and the image of the 8×8 pixel block after resolution conversion is calculated by equation (1) described above. In step S41, the image data of 8×8 pixels after resolution conversion is lossy-encoded. The obtained lossy-encoded data is temporarily stored in the RAM 603.

Then, the process advances to step S42 to determine whether the difference information Dt, run ratio Rr, and two-color ratio Cr obtained in the above-described way satisfy condition (2) described above. That is, it is determined whether the pixel block of interest belongs to a specific pattern.

If it is determined that the pixel block of interest belongs to a specific pattern, the process advances to step S43 to select encoded data of a type priority-designated and store the encoded data in an output buffer ensured in the RAM 603.

If it is determined that the pixel block of interest does not belong to a specific pattern, the process advances to step S44. In step S44, the CPU compares the data amount of the lossless-encoded data with that of the lossy-encoded data which are temporarily stored in the RAM 603. Encoded data with a smaller amount is output to the output buffer (steps S45 and S46).

The process from step S32 is repeated until it is determined in step S47 that all pixel blocks are encoded. If all pixel blocks are encoded, the process advances to step S48 to store the data in the HDD 604 as a file. At this time, The file header stores, as an image size, W as the number of horizontal pixels of the read document image and H as the number of vertical pixels. If dummy data is present, dummy data count information and identification information indicating "color" are stored in the header.

Figure 15:
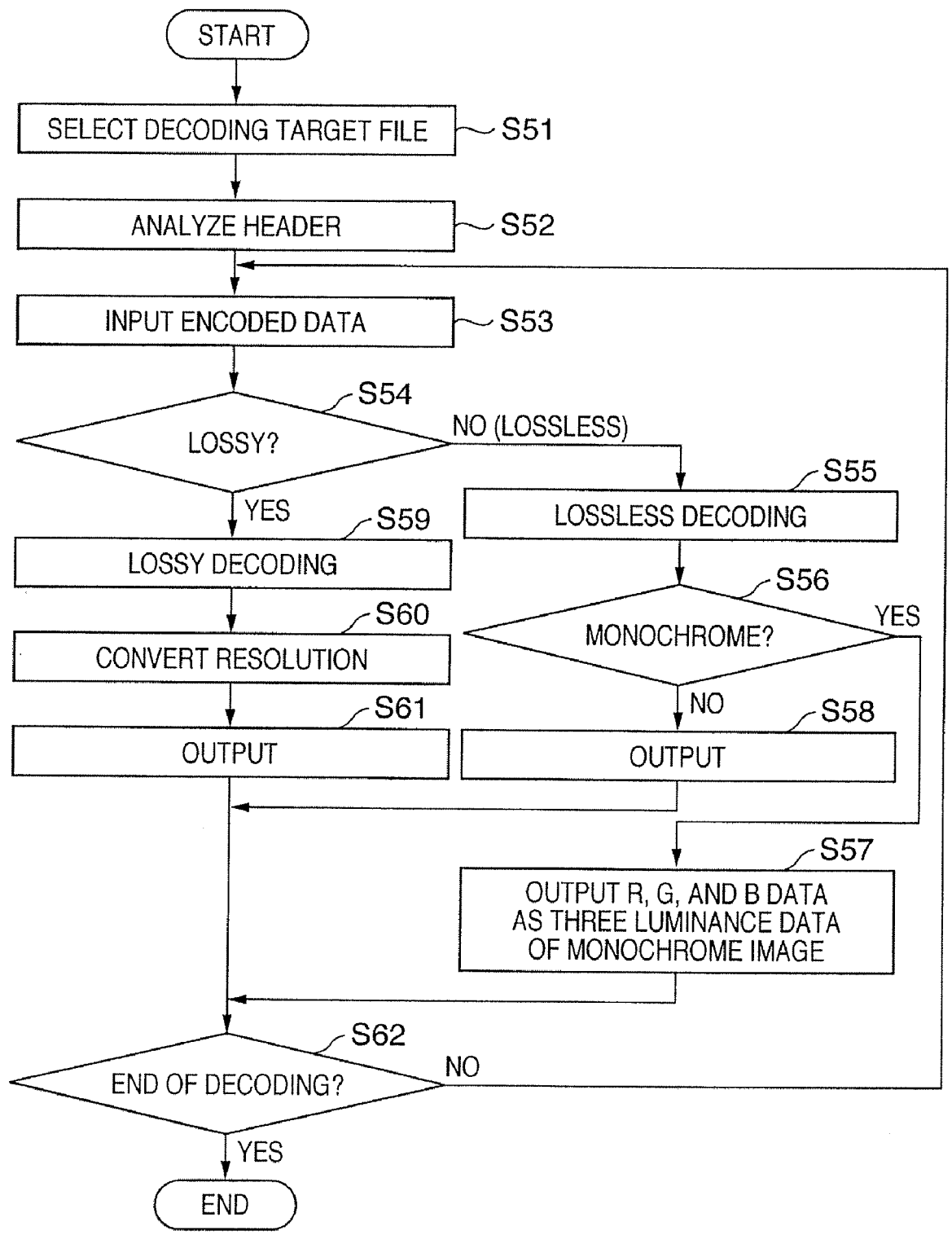
FIG. 15 is a flowchart illustrating a decoding process procedure according to the first modification to the fourth embodiment.

A decoding process will be described next with reference to the flowchart in FIG. 15.

In step S51, an appropriate GUI of a file list is displayed. The process waits until the user selects a file as a decoding target and clicks on a decoding start button (not shown) on the GUI.

When a decoding start instruction is input, the process advances to step S52 to analyze the header of the selected file to acquire information necessary for decoding.

The process advances to step S53 to read out encoded data from the selected file.

In step S54, the header of the readout encoded data is analyzed to determine whether the encoded data is lossy-encoded data or lossless-encoded data.

If the data is determined as lossless-encoded data, the process advances to step S55 to execute lossless decoding. In step S56, it is determined whether the identification information in the file header analyzed in step S52 indicates "monochrome". If YES in step S56, R, G, and B data obtained by decoding axe pseudo R, G, and B data. In step S57, the R, G, and B data are output as three luminance data. If the output target is a display device, three R, G, and B components are necessary for each pixel. Hence, in the display mode, one luminance value is copied to three R, G, and B components and output.

If it is determined in step S56 that the identifier in the file header indicates "color", decoded R, G, and B data are directly output (step S58).

If it is determined in step S54 that the data read out from the decoding target file is lossy-encoded data, the process advances to step S59.

In step S59, lossy decoding is executed. As a result, color image data of 8×8 pixels is obtained. In step S60, resolution conversion is executed. In this resolution conversion, image data of 8×8 pixels is converted into image data of 16×16 pixels. The conversion algorithm can be linear interpolation. In step S61, the result of resolution conversion is output.

In step S62, it is determined whether one page is decoded. If NO in step S62, the process from step S53 is repeated. If it is determined that one page is decoded, the process is ended.

As described above, even this modification can provide the same functions and effects as in the fourth embodiment. That is, it is possible to encode both a color image and a monochrome grayscale image by using a color image encoding engine program. When the number of components of a color image is N, the time required to encode a monochrome grayscale image can shorten to 1/N at maximum.

According to the above-described procedure, calculation of the difference information Dt, run ratio Rr, and two-color ratio Cr and lossy encoding are not executed in encoding a monochrome grayscale image. Hence, the encoding process can be done at a high speed.

Second Modification to Fourth Embodiment

In this modification, particularly, an example that enables encoding to a target code amount or less if the reading mode is the color reading mode will be described. The arrangement of the encoding unit 305 is the same as in FIG. 10, and a description thereof will not be repeated. In the monochrome reading mode, the second modification is the same as the fourth embodiment.

The first encoding unit 504 is a lossy encoding unit complying with the JPEG method, as described above. In the JPEG encoding process, 8×8 conversion coefficients after DCT are quantized to reduce the data amount. In quantization, a quantization matrix including 8×8 quantization step values is used.

Figure 16:
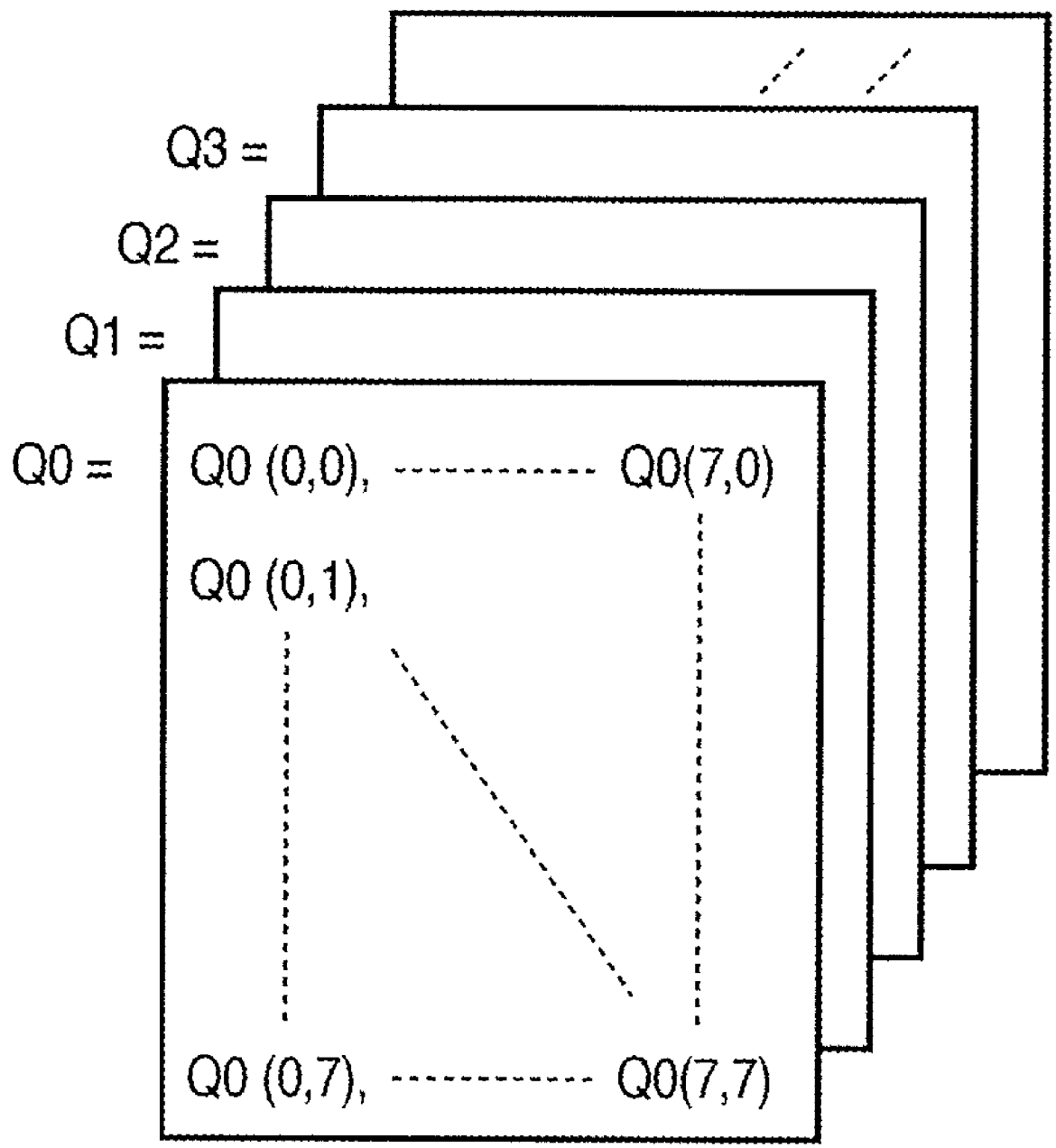
FIG. 16 is a view showing an example of quantization matrix tables employed in the second modification to the fourth embodiment.

FIG. 16 shows quantization matrix tables Q0, Q1, and Q2 used to quantize frequency coefficients after DCT (the quantization matrix tables are stored in the encoding sequence control unit 510). Values Qi (0,0) to Qi (7,7) (i=0, 1, 2, . . . ) in the quantization matrix tables indicate quantization step values. The quantization step values almost have a relationship Q0<Q1<Q2 . . . . As the quantization step value becomes large, the possible range of frequency coefficient values after quantization narrows, and the compression ratio rises.

The first encoding unit 504 encodes an image of one page by using the quantization matrix Q0. If the total encoded data amount stored in the output buffer memory 521 has exceeded the target code amount during encoding of one page, reading of the same document starts again, and the data is encoded by using the quantization matrix Q1. Every time it is determined that the total encoded data amount has exceeded the target code amount, the quantization matrix to use is updated to Q2, Q3, . . . .

If lossless encoding is selected as the priority encoding type, and most of the encoded data stored in the output buffer memory 521 are lossless-encoded data, it is impossible to reduce the code amount to the target code amount or less even when the quantization matrix is updated many times.

In the second or subsequent encoding of a document image, the priority encoding type is changed to lossy encoding forcibly.

As a result, if the data amount of encoded data stored in the output buffer memory 521 during the first encoding process in the color reading mode has exceeded the target code amount, all encoded data in re-encoding are lossy-encoded data. Hence, it is possible to reliably to reduce the code amount depending on the quantization matrix and finally reduce it to the target code amount or less.

It is easy to calculate the data amount of encoded data stored in the output buffer memory 521. This is because the encoding sequence control unit 510 need only cumulatively add the code amounts of encoded data (information from the first code length detection unit 506 and second code length detection unit 507) as a selection target designated for the memory control unit 520.

Fifth Embodiment

The first to fourth embodiments assume that the image processing unit 300 in FIG. 1 has the arrangement in FIG. 2. In the fifth embodiment, an image processing unit 300 in FIG. 1 has an arrangement in FIG. 17.

Figure 17:
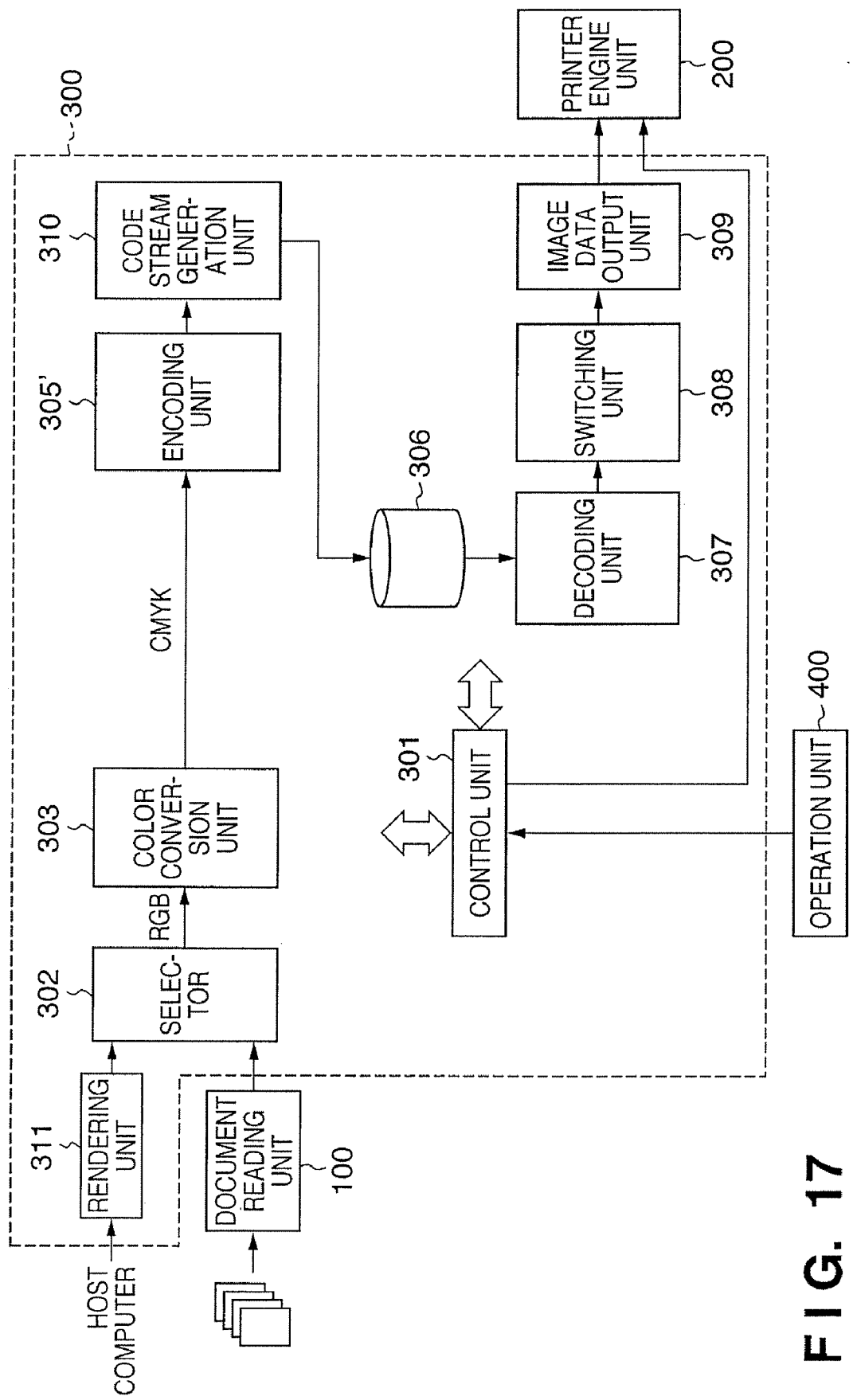
FIG. 17 is a block diagram of an image processing unit 300 according to the fifth embodiment.

FIG. 17 shows an arrangement in which the switching unit 304 in FIG. 2 is removed, and the encoding unit 305 changes to an encoding unit 305'. The remaining components are the same, and a description thereof will not be repeated.

Figure 18:
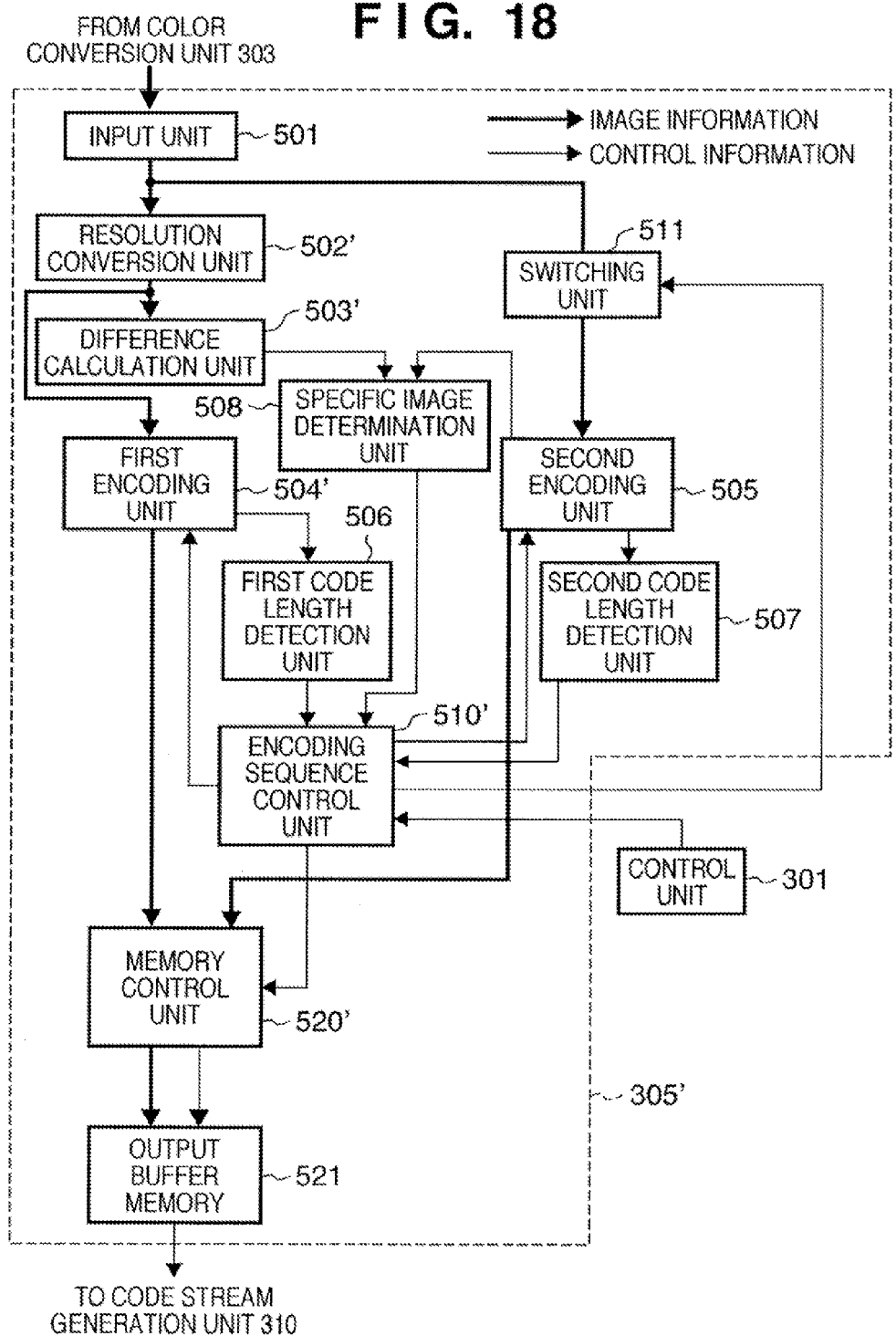
FIG. 18 is a block diagram of an encoding unit 305' in FIG. 17.

FIG. 18 shows the arrangement of the encoding unit 305' according to the fifth embodiment. FIG. 18 corresponds to FIG. 10 of the fourth embodiment, and the same reference numerals as in FIG. 10 denote the same constituent elements in FIG. 18. The difference between FIGS. 18 and 10 is that a switching unit 511 is provided immediately before a second encoding unit 505 in FIG. 18. A resolution conversion unit 502', difference calculation unit 503', and first encoding unit 504' in FIG. 18 have functions different from those of corresponding components in FIG. 10 (this will be described later in detail).

An input unit 501 receives C, M, Y, and K data from a color conversion unit 303.

In the fifth embodiment, in a color reading mode, the switching unit 511 directly outputs C, M, Y, and K data received from the input unit 501 to the second encoding unit 505. The remaining constituent elements perform the same operations as in the fourth embodiment. Hence, as the operation in the color reading mode, the operation of the fourth embodiment will be cited here, and a detailed description thereof will not be repeated.

The operation in a monochrome reading mode will be described below. First, noteworthy points in the monochrome reading mode will be listed below.

The resolution conversion unit 502' neglects three, C, M, and Y component data and executes resolution conversion only for K component data of 16×16 pixels from the input unit 501.

The difference calculation unit 503' outputs, to a specific image determination unit 508, the difference between the image data of the K component of 16×16 pixels before resolution conversion and the image data of 8×8 pixels after resolution conversion as difference information Dt.

The first encoding unit 504' executes lossy encoding for the image data of the K component after resolution conversion.

That is, in the monochrome reading mode, the resolution conversion unit 502', difference calculation unit 503', and first encoding unit 504' process data in a load ¼ that in the color reading mode. In other words, these processing units can process data in a time ¼ that in the color reading mode.

Upon receiving a monochrome reading mode notification from a control unit 301, an encoding sequence control unit 510' instructs the resolution conversion unit 502' difference calculation unit 503', and first encoding unit 504' to process only the K component.

As a result, the first encoding unit 504' generates lossy-encoded data of the K component data of 8×8 pixels after resolution conversion.

When the reading mode is the monochrome reading mode, the encoding sequence control unit 510' notifies the switching unit 511 of it. Upon receiving this notification, the switching unit 511 neglects the C, M, and Y component data of the received C, M, Y, and K data. The switching unit 511 rearranges four consecutive K component data into pseudo C, M, Y, and K component data and outputs them to the second encoding unit 505. That is, the switching unit 511 executes an operation equivalent to that of the switching unit 304 of the fourth embodiment.

Consequently, the first encoding unit 504' and second encoding unit 505 encode the K component data received by the input unit 501

Control of the encoding sequence control unit 510' according to the fifth embodiment will be described below (for control in the color copy mode, see the fourth embodiment).

[In Monochrome Copy Mode]

In the following explanation, let LH be the code length of lossy-encoded data detected by a first code length detection unit 506, and LK be the code length of lossless-encoded data detected by a second code length detection unit 507. When the condition (2) is satisfied, the specific image determination unit 508 outputs a determination signal Dp=1 to the encoding sequence control unit 510'. When the condition (2) is not satisfied, the specific image determination unit 508 outputs a determination signal Dp=0 to the encoding sequence control unit 510'.

The encoding sequence control unit 510' determines encoded data to be output to an output buffer memory 521 in the following way.

<When Dp=1>

The encoding sequence control unit 510' determines to output the priority-designated lossless-encoded data (encoded data obtained by the second encoding unit 505) to the output buffer memory 521. Until encoding of one page finishes, the selection target is fixed without changing.

<When Dp=0>

When LH<LK, the encoding sequence control unit 510' determines to output the lossy-encoded data (encoded data obtained by the first encoding unit 504) to the output buffer memory 521.

When LH≧LK, the encoding sequence control unit 510 determines to output the lossless-encoded data (encoded data obtained by the second encoding unit 505) to the output buffer memory 521.

As described above, the encoding sequence control unit 510' of the fifth embodiment is the same as in the color reading mode.

In decoding a file for which identification information in the file header indicates "monochrome", when encoded data with a header indicating "lossless encoding" is decoded, a switching unit 308 outputs four C, M, Y, and K component data of one pixel as four K components.

As described above, according to the fifth embodiment, even for a monochrome grayscale image, the encoding unit can adaptively select lossy encoding or lossless encoding and generate encoded data containing both lossy-encoded data and lossless-encoded data by using encoding for a color image. Consequently, the compression ratio of a monochrome grayscale image can be made higher than that in the fourth embodiment.

Even in the fifth embodiment, lossy-encoded data and lossless-encoded data never mix in an image area having the propriety of a specific pattern so noise is not generated at the boundaries between blocks as encoding units, as in the fourth embodiment.

Modification to Fifth Embodiment

In the fifth embodiment, the present invention is applied to a copying machine or a printing apparatus. The encoding process and decoding process corresponding to the fifth embodiment may be applied to an application program executed on a general-purpose information processing apparatus such as a personal computer.

Figure 20:
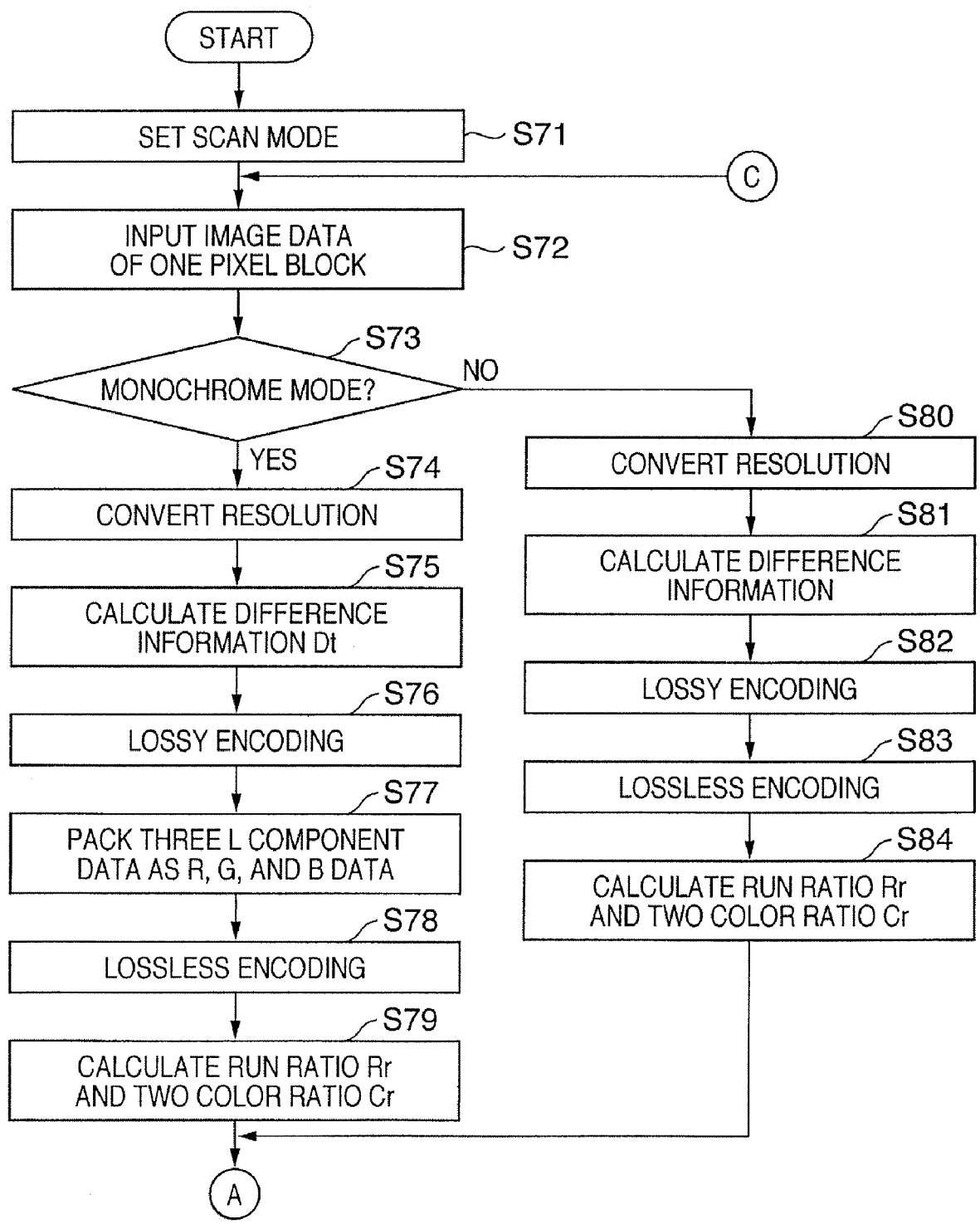
FIG. 20 is a flowchart illustrating part of an encoding process procedure according to a modification to the fifth embodiment.

In this case, the apparatus arrangement can be the same as in FIG. 5. The encoding process of an application program (stored in an HDD 604) executed by a CPU 601 will be described with reference to the flowchart in FIG. 20. In this modification, image data expressed by three R, G, and G components is encoded in a color encoding process, for the descriptive convenience. In scanning in a monochrome reading mode, an image scanner transfers only a luminance component. The luminance data is expressed as an L component for the sake of convenience.

In step S71, a reading mode by an image scanner 610 is set. The reading mode is determined by displaying a GUI window (not shown) on a display device 607 and causing the user to operate a keyboard & mouse 605. The reading modes include a color reading mode and a monochrome grayscale reading mode. The document size and reading resolution may also be set. When the user inputs a reading start instruction, the image scanner 610 outputs the image data of the read document (R, G, and B component data in a color mode or L component data in a monochrome mode).

In step S72, the received image data is stored in a reception buffer ensured in a RAM 603. Image data of, e.g., 16×16 pixels is read out from there.

The process advances to step S73 to determine whether the image data received from the image scanner is monochrome grayscale image data or color image data. This determination is done on the basis of the reading mode set in step S71.

If the image is determined to be a monochrome grayscale image, the process advances to step S74. If the image is determined to be a color image, the process advances to step S80.

In step S74, the resolution of the L component data of 16×16 pixels is converted to generate L component data of 8×8 pixels. In step S75, the difference information Dt is calculated. In step S76, the image data of the L component after resolution conversion is lossy-encoded, and the result is temporarily stored in an appropriate area of the RAM 603. At this time, identification information representing lossy-encoded data is added to the header of the encoded data.

In step S77, three L component data are packed into a pseudo R, G, and B data. In step S78, the packing result is transferred to a color image lossless encoding process function to generate lossless-encoded data. The generated lossless-encoded data is temporarily stored in an appropriate area of the RAM 603. The run ratio Rr and two-color ratio Cr are also calculated on the basis of flags generated during the lossless encoding process (step S79).

If it is determined in step S73 that the image data received from the image scanner is color image data, the process advances to step S80.

In step S80, the resolution of the color image of 16×16 pixels is converted to generate a color image of 8×8 pixels. In step S81, the difference information Dt is calculated. In step S82, the color image data after resolution conversion is lossy-encoded, and the result is temporarily stored in an appropriate area of the RAM 603. At this time, identification information representing lossless-encoded data is added to the header of the encoded data.

In step S83, the color image of 16×16 pixels before resolution conversion is lossless-encoded. The generated lossless-encoded data is temporarily stored in an appropriate area of the RAM 603. The run ratio Rr and two-color ratio Cr are also calculated on the basis of flags generated during the lossless encoding process (step S84).

Figure 14:
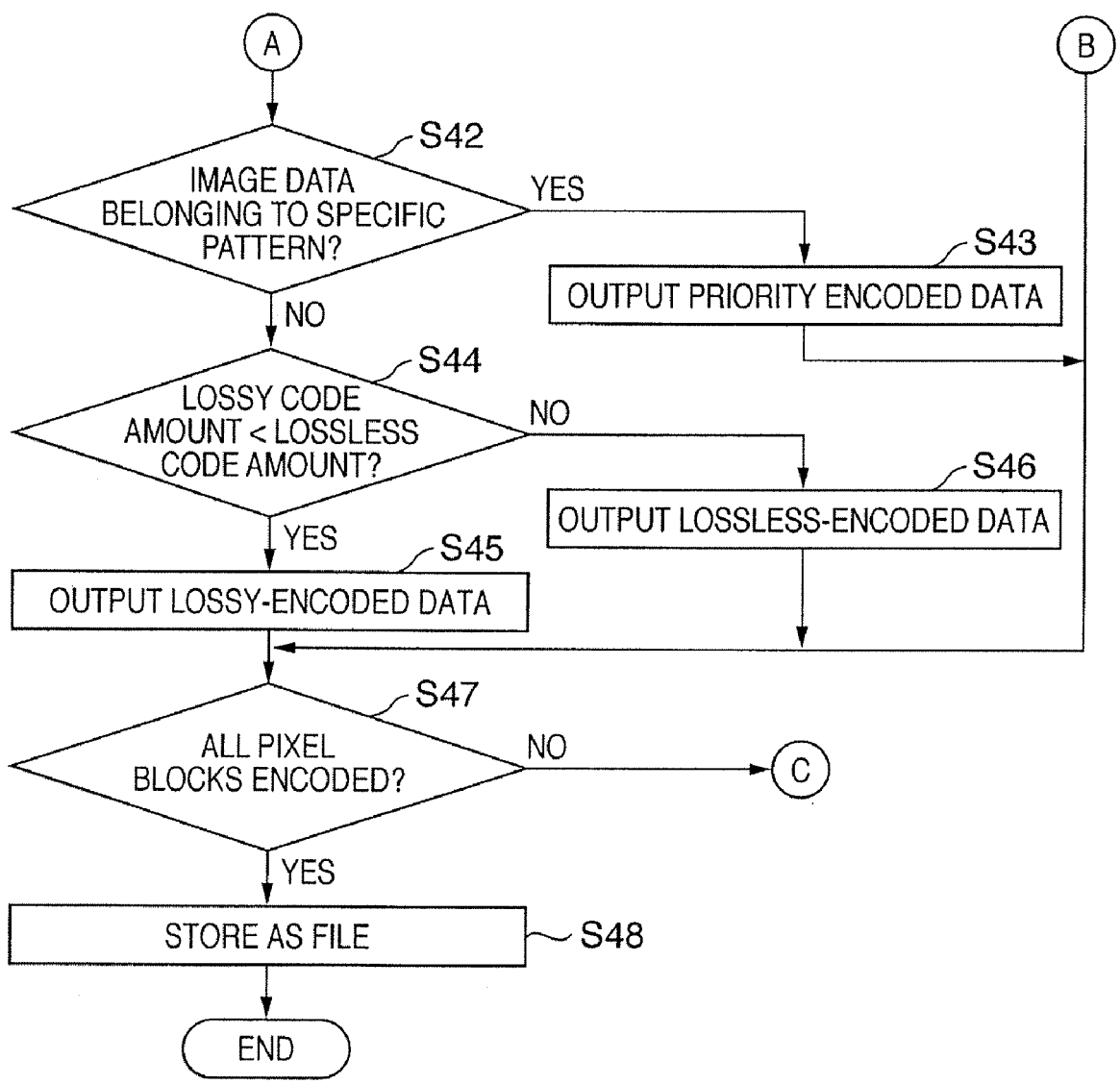
FIG. 14 is a flowchart illustrating an encoding process procedure according to the first modification to the fourth embodiment.

Next to the process in step S79 or S84, the process from step S42 in FIG. 14 is executed. The decoding process is the same as in FIG. 15, and a description thereof will not be repeated.

A modification to the fifth embodiment has been described above. As is apparent, the same technique as in the second modification to the fourth embodiment is applicable to the fifth embodiment.

The embodiments of the present invention and their modifications have been described above.

In the embodiments, a color image as an encoding target of the encoding unit 305 or 305' is expressed by four C, M, Y, and K components. In the implementation examples by a program described in the modifications, a color image is expressed by three R, G, and B components. These are merely examples for the sake of convenience. The number of color components and the type of color space are not limited to those, as is apparent from the above explanation.

In the embodiments, the encoding unit is 16×16 pixels. This is also merely an example for the sake of convenience, and the size is not limited to this. However, if JPEG is used as lossy encoding, and the resolution conversion unit 502 is provided, as in the fourth embodiment, encoding is preferably executed for each block of 8M×8N pixels (N and N are integers more than 1).

When the fourth or fifth embodiment or their modifications are employed, the size of an image output from the input unit 501 is preferably larger than 16×16 pixels. This is because for a monochrome grayscale image, four K components are output as pseudo C, M, Y, and K component data. That is, this process is equivalent to causing the second encoding unit 505 to lossless-encode image data of 4×16 pixels. The number of runs is "14" at maximum, and the encoding efficiency decreases. The input unit 501 preferably outputs image data of at least 32×32 pixels.

In the embodiments, JPEG-LS has been exemplified as a lossless encoding method, and JPEG has been exemplified as a lossy encoding method. Any other encoding method may be employed. Instead of the lossless encoding method (JPEG-LS), a lossy encoding method that rarely degrades the image quality in encoding may be used.

As described in the modifications to the first and fourth embodiments, the present invention is applicable to a computer program to be read out and executed by a computer. The computer program is normally stored in a computer-readable storage medium such as a CD-ROM. The computer program becomes executable when it is set in a read device (CD-ROM drive) of a computer and copied or installed in the system. Such a computer-readable storage medium is also incorporated in the present invention, as a matter of course.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-216259, filed Aug. 8, 2006, which is hereby incorporated by reference herein in its entirety.

What is claimed is:

1. An image processing apparatus for encoding one of monochrome image data expressed by one color component and color image data expressed by N components, comprising:
    at least one processor operable to function as:
        an input unit adapted to input encoding target image data;
        an image identification unit adapted to identify whether the encoding target image data input by said input unit is monochrome image data or color image data;
        a switching unit adapted to pass the color image data when said image identification unit identifies the input image data as a color image, and rearrange M ($2 \leq M \leq N$) component data in the monochrome image into pseudo data of M components of one pixel of a color image and output the data when said image identification unit identifies the input image data as a monochrome image;
        an acquisition unit adapted to acquire image data of each pixel block containing a plurality of pixels from the color image data output via said switching unit;
        a first encoding unit adapted to lossy-encode the acquired image data of the pixel block;
        a second encoding unit adapted to lossless-encode the acquired image data of the pixel block;
        a specific pattern determination unit adapted to determine whether the image data of the pixel block has a property of a preset specific pattern; and
        an output control unit adapted to select one of lossy-encoded data obtained by said first encoding unit and lossless-encoded data obtained by said second encoding unit on the basis of a data amount of the lossy-encoded data obtained upon encoding by said first encoding unit, a data amount of the lossless-encoded data obtained upon encoding by said second encoding unit, an identification result from said image identification unit, and a determination result from said specific pattern determination unit, and output the selected data,
    wherein said output control unit
        (a) outputs the lossless-encoded data when the identification result from said image identification unit indicates a monochrome image,
        (b) outputs one of the lossy-encoded data and the lossless-encoded data, which is designated in advance, when the identification result from said image identification unit indicates a color image, and said specific pattern determination unit determines that a pixel block of interest has the property of the specific pattern, and
        (c) outputs one of the lossy-encoded data and the lossless-encoded data, which has a smaller code amount, when the identification result from said image identification unit indicates a color image, and said specific pattern determination unit determines that the pixel block of interest does not have the property of the specific pattern.

2. The apparatus according to claim 1, further comprising a resolution conversion unit adapted to convert a resolution of the image data of the pixel block acquired by said acquisition unit into a lower resolution,
    wherein said first encoding unit lossy-encodes the image data after resolution conversion.

3. The apparatus according to claim 2, wherein said specific pattern determination unit comprises:
    a difference information calculation unit adapted to calculate difference information Dt between the image data after resolution conversion by said resolution conversion unit and the image data before resolution conversion;
    a two-color count calculation unit adapted to calculate the number Cr of times when the number of colors contained in a plurality of neighboring pixels around a pixel of interest is 2 during scanning in the pixel block;
    a continuous pixel count calculation unit adapted to calculate the number Rr of times when the pixel of interest is the same as an immediately preceding pixel during scanning in the pixel block; and
    a unit adapted to determine that the pixel block of interest has the property of the specific pattern when threshold values Th1, Th2, and Th3, and Dt, Cr, and Rr satisfy Condition: $Dt > Th1$, $Cr > Th2$, and $Rr < Th3$, and that the pixel block of interest does not have the property of the specific pattern when the condition is not satisfied.

4. The apparatus according to claim 1, wherein said output control unit
    stores encoded data in a storage unit as a file,
    stores identification information of said image identification unit in a header of the file, and
    stores lossless/lossy identification information in a header of encoded data of each pixel block.

5. An image processing apparatus for decoding encoded data, comprising:
    at least one processor operable to function as:
        an input unit adapted to input encoded image data which has image identification information to identify whether an original image is a color image expressed by N components or a monochrome image expressed by one component, and pixel block identification information indicating whether encoded data of a pixel block expressed by a plurality of pixels is lossy-encoded data or lossless-encoded data;
a first decoding unit adapted to decode one of a lossy-encoded color image and a lossy-encoded monochrome image;
a second decoding unit adapted to decode lossless-encoded data of a color image containing N components;
a determination unit adapted to determine the image identification information and the pixel block identification information of the input encoded data;
a supply unit adapted to supply the encoded data to said first decoding unit when said determination unit determines that encoded data of a pixel block of interest is lossy-encoded data, and
supply the encoded data to said second decoding unit when said determination unit determines that encoded data of the pixel block of interest is lossless-encoded data; and
an output control unit adapted to output one of monochrome image data and color image data obtained by decoding when said first decoding unit decodes the image data,
output color image data obtained upon decoding by said second decoding unit when said determination unit determines that the original image is a color image, and
output M ($2 \leq M \leq N$) component data of one pixel contained in the color image data obtained upon decoding by said second decoding unit as M data of a monochrome image expressed by one color component when said determination unit determines that the original image is a monochrome image.

6. A control method of an image processing apparatus for encoding one of monochrome image data expressed by one color component and color image data expressed by N components, comprising:
the input step of inputting encoding target image data;
the image identification step of identify whether the encoding target image data input in the input step is monochrome image data or color image data;
the switching step of passing the color image data when the input image data is identified as a color image in the image identification step, and rearranging N component data in the monochrome image into pseudo data of M ($2 \leq M \leq N$) components of one pixel of a color image and outputting the data when the input image data is identified as a monochrome image in the image identification step;
the acquisition step of acquiring image data of each pixel block containing a plurality of pixels from the color image data output via the switching step;
the first encoding step of lossy-encoding the acquired image data of the pixel block;
the second encoding step of lossless-encoding the acquired image data of the pixel block;
the specific pattern determination step of determining whether the image data of the pixel block has a property of a preset specific pattern; and
the output control step of selecting one of lossy-encoded data obtained in the first encoding step and lossless-encoded data obtained in the second encoding step on the basis of a data amount of the lossy-encoded data obtained upon encoding in the first encoding step, a data amount of the lossless-encoded data obtained upon encoding in the second encoding step, an identification result in the image identification step, and a determination result in the specific pattern determination step, and outputting the selected data,
wherein in the output control step
(a) the lossless-encoded data is output when the identification result in the image identification step indicates a monochrome image,
(b) one of the lossy-encoded data and the lossless-encoded data, which is designated in advance, is output when the identification result in the image identification step indicates a color image, and it is determined in the specific pattern determination that a pixel block of interest has the property of the specific pattern, and
(c) one of the lossy-encoded data and the lossless-encoded data, which has a smaller code amount, is output when the identification result in the image identification step indicates a color image, and it is determined in the specific pattern determination step that the pixel block of interest does not have the property of the specific pattern.

7. A non-transitory computer-readable storage medium storing a program, which when executed by a computer causes the computer to perform the method of claim 6.

8. A control method of an image processing apparatus for decoding encoded data, comprising:
the input step of inputting encoded image data which has image identification information to identify whether an original image is a color image expressed by N components or a monochrome image expressed by one component, and pixel block identification information indicating whether encoded data of a pixel block expressed by a plurality of pixels is lossy-encoded data or lossless-encoded data;
the first decoding step of decoding one of a lossy-encoded color image and a lossy-encoded monochrome image;
the second decoding step of decoding lossless-encoded data of a color image containing N components;
the determination step of determining the image identification information and the pixel block identification information of the input encoded data;
the supply step of supplying the encoded data to the first decoding step when it is determined in the determination step that encoded data of a pixel block of interest is lossy-encoded data, and
supplying the encoded data to the second decoding step when it is determined in the determination step that encoded data of the pixel block of interest is lossless-encoded data; and
the output control step of outputting one of monochrome image data and color image data obtained by decoding when the image data is decoded in the first decoding step,
outputting color image data obtained upon decoding in the second decoding step when it is determined in the determination step that the original image is a color image, and
outputting M ($2 \leq M \leq N$) component data of one pixel contained in the color image data obtained upon decoding in the second decoding step as M data of a monochrome image expressed by one color component when it is determined in the determination step that the original image is a monochrome image.

9. A non-transitory computer-readable medium storing a program which when executed by a computer causes the computer to the method of claim 8.

10. An image processing apparatus for encoding image data, comprising:
at least one processor operable to function as:
an encoding unit adapted to encode color image data expressed by N (N≧2) components;
a determination unit adapted to determine whether encoding target image data is monochrome image data containing one component or color image data containing data of the N components;
a supply unit adapted to supply the color image data to said encoding unit when said determination unit determines that the encoding target image data is the color image data, and supply M (2≦M≦N) data in the monochrome image data to said encoding unit as pseudo data of M components in the N components of the color image when said determination unit determines that the encoding target image data is the monochrome image data; and
an output unit adapted to output encoded data generated by said encoding unit from the data supplied by said supply unit.

11. The apparatus according to claim 10, wherein said output unit adds information of a determination result of said determination unit to the encoded data generated by said encoding unit and outputs the encoded data.

12. The apparatus according to claim 10, wherein said supply unit supplies, to said encoding unit, M data consecutive in a raster scan direction of an input monochrome image as M component data of one color pixel data.

13. The apparatus according to claim 10, wherein said supply unit supplies, to said encoding unit, M data at the same main scanning coordinate position in adjacent N lines of raster scan of an input monochrome image as M component data of one color pixel data.

14. The apparatus according to claim 10, wherein when the number N of components of one pixel of the color image data can be defined by m×n (m, n≧2), said supply unit supplies, to said encoding unit, data in an m×n two-dimensional window in a plurality of adjacent lines of raster scan of an input monochrome image as one color pixel data.

15. An image processing apparatus for decoding encoded image data, comprising:
at least one processor operable to function as:
a decoding unit adapted to decode encoded data of color image data containing N (N≧2) components;
an input unit adapted to input encoded data which includes identification information to identify whether an original image is a color image or a monochrome image and has a data format of a color image encoding method;
a supply unit adapted to supply the encoded data input by said input unit to said decoding unit;
a determination unit adapted to determine whether the identification information input by said input unit indicates a color image or a monochrome image; and
an output unit adapted to output color image data obtained by decoding the encoded data supplied by said supply unit when said determination unit determines that the identification information indicates a color image, and output data of M (2≦M≦N) components of one pixel contained in the color image data obtained by decoding the encoded data supplied by said supply unit as M data of a monochrome image expressed by one color component when said determination unit determines that the identification information indicates a monochrome image data.

16. A control method of an image processing apparatus for encoding image data, comprising the steps of:
encoding color image data expressed by N (N≧2) components;
determining whether encoding target image data is monochrome image data containing one component or color image data containing data of the N components;
supplying the color image data to the encoding step when it is determined in the determining step that the encoding target image data is the color image data, and supplying M (2≦M≦N) data in the monochrome image data to the encoding step as pseudo data of M components in the N components of the color image when it is determined in the determining step that the encoding target image data is the monochrome image data; and
outputting encoded data generated in the encoding step from the data supplied in the supplying step.

17. A non-transitory computer-readable medium storing a program which when executed by a computer causes the computer to perform the method of claim 16.

18. A control method of an image processing apparatus for decoding encoded image data, comprising the steps of:
decoding encoded data of color image data containing N (N≧2) components;
inputting encoded data which includes identification information to identify whether an original image is a color image or a monochrome image and has a data format of a color image encoding method;
supplying the encoded data input in the inputting step to the decoding step;
determining whether the identification information input in the inputting step indicates a color image or a monochrome image; and
outputting color image data obtained by decoding the encoded data supplied in the supplying step when it is determined in the determining step that the identification information indicates a color image, and
outputting data of M (2≦M≦N) components of one pixel contained in the color image data obtained by decoding the encoded data supplied in the supplying step as M data of a monochrome image expressed by one color component when it is determined in the determining step that the identification information indicates a monochrome image data.

19. A non-transitory computer-readable medium storing a program, which when executed by a computer causes the computer to perform the method of claim 18.

20. An image processing apparatus for encoding one of monochrome image data expressed by one component and color image data expressed by N (N≧2) components, comprising:
at least one processor operable to function as:
an input unit adapted to input encoding target image data;
an image identification unit adapted to identify whether the encoding target image data input by said input unit is monochrome image data or color image data;
a first encoding unit adapted to lossy-encode image data of each pixel block containing a plurality of pixels in the image data input by said input unit;
a switching unit adapted to pass the color image data when said image identification unit identifies the input image data as a color image, and rearrange M (2≦M≦N) component data in the monochrome image into pseudo data of M components of one pixel of a color image and output the data when said image identification unit identifies the input image data as a monochrome image;

a second encoding unit adapted to lossless-encode image data of each pixel block containing a plurality of pixels in the color image data output via said switching unit;

a specific pattern determination unit adapted to determine whether the image data of the pixel block has a property of a preset specific pattern; and an output control unit adapted to select one of lossy-encoded data obtained by said first encoding unit and lossless-encoded data obtained by said second encoding unit on the basis of a data amount of the lossy-encoded data obtained upon encoding by said first encoding unit, a data amount of the lossless-encoded data obtained upon encoding by said second encoding unit, and a determination result from said specific pattern determination unit, and output the selected data, wherein said output control unit
(a) outputs one of the lossy-encoded data and the lossless-encoded data, which is designated in advance, when said specific pattern determination unit determines that a pixel block of interest has the property of the specific pattern, and
(b) outputs one of the lossy-encoded data and the lossless-encoded data, which has a smaller code amount, when said specific pattern determination unit determines that the pixel block of interest does not have the property of the specific pattern.

21. The apparatus according to claim 20, further comprising a resolution conversion unit adapted to convert a resolution of the image data of each pixel block containing a plurality of pixels in the image data input by said input unit into a lower resolution, wherein said first encoding unit lossy-encodes the image data after resolution conversion.

22. The apparatus according to claim 21, wherein said specific pattern determination unit comprises:

a difference information calculation unit adapted to calculate difference information Dt between the image data after resolution conversion by said resolution conversion unit and the image data before resolution conversion;

a two-color count calculation unit adapted to calculate the number Cr of times when the number of colors contained in a plurality of neighboring pixels around a pixel of interest is 2 during scanning in the pixel block;

a continuous pixel count calculation unit adapted to calculate the number Rr of times when the pixel of interest is the same as an immediately preceding pixel during scanning in the pixel block; and a unit adapted to determine that the pixel block of interest has the property of the specific pattern when threshold values $Th1$, $Th2$, and $Th3$, and Dt, Cr, and Rr satisfy Condition: $Dt>Th1$, $Cr>Th2$, and $Rr<Th3$, and that the pixel block of interest does not have the property of the specific pattern when the condition is not satisfied.

23. The apparatus according to claim 20, wherein said output control unit
stores encoded data in a storage unit as a file,
stores identification information of said image identification unit in a header of the file, and
stores lossless/lossy identification information in a header of encoded data of each pixel block.

24. A control method of an image processing apparatus for encoding one of monochrome image data expressed by one component and color image data expressed by N ($N \geq 2$) components, comprising:

the input step of inputting encoding target image data;

the image identification step of identifying whether the encoding target image data input in the input step is monochrome image data or color image data;

the first encoding step of lossy-encoding image data of each pixel block containing a plurality of pixels in the image data input in the input step;

the switching step of passing the color image data when the input image data is identified as a color image in the image identification step, and rearranging M ($2 \leq M \leq N$) component data in the monochrome image into pseudo data of M components of one pixel of a color image and outputting the data when the input image data is identified as a monochrome image in the image identification step;

the second encoding step lossless-encoding image data of each pixel block containing a plurality of pixels in the color image data output via the switching step;

the specific pattern determination step of determining whether the image data of the pixel block has a property of a preset specific pattern; and the output control step of selecting one of lossy-encoded data obtained in the first encoding step and lossless-encoded data obtained in the second encoding step on the basis of a data amount of the lossy-encoded data obtained upon encoding in the first encoding step, a data amount of the lossless-encoded data obtained upon encoding in the second encoding step, and a determination result in the specific pattern determination step, and outputting the selected data, wherein in the output control step
(a) one of the lossy-encoded data and the lossless-encoded data, which is designated in advance, is output when it is determined in the specific pattern determination step that a pixel block of interest has the property of the specific pattern, and
(b) one of the lossy-encoded data and the lossless-encoded data, which has a smaller code amount, is output when it is determined in the specific pattern determination step that the pixel block of interest does not have the property of the specific pattern.

25. A non-transitory computer-readable medium storing a program which, when executed by a computer causes the computer to the method of claim 24.

* * * * *